United States Patent
Nicholson et al.

(10) Patent No.: US 10,070,105 B2
(45) Date of Patent: Sep. 4, 2018

(54) OR-FUNCTION ILLUMINATION IN PHASED BITPLANES IN A HIGH DYNAMIC RANGE PROJECTOR

(71) Applicant: CHRISTIE DIGITAL SYSTEMS USA, INC., Cypress (CA)

(72) Inventors: Stuart James Myron Nicholson, Waterloo (CA); Lawrence Goerzen, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 205 days.

(21) Appl. No.: 15/054,363

(22) Filed: Feb. 26, 2016

(65) Prior Publication Data

US 2017/0251185 A1    Aug. 31, 2017

(51) Int. Cl.
*G09G 3/34* (2006.01)
*H04N 9/31* (2006.01)
(Continued)

(52) U.S. Cl.
CPC ........... *H04N 9/312* (2013.01); *H04N 9/3164* (2013.01); *G09G 2320/0247* (2013.01)

(58) Field of Classification Search
CPC .......... G09G 3/002; G09G 2320/0646; G09G 2320/0653; G09G 3/3426; G09G 2320/0209; G09G 2320/0238; G09G 2320/0247; G09G 3/0218; G09G 2300/023; G09G 3/2022; G09G 3/346; G09G 3/2029; G09G 2310/0218; H04N 1/4055;
(Continued)

(56) References Cited

U.S. PATENT DOCUMENTS

2003/0048393 A1* 3/2003 Sayag ................. G09G 3/3611
                                                          349/5
2004/0001184 A1* 1/2004 Gibbons ................. H04N 5/20
                                                          353/31
(Continued)

FOREIGN PATENT DOCUMENTS

EP              0829747 A1    3/1998
WO          2015017485 A1    2/2015
WO       WO-2105066206 A1    5/2015

OTHER PUBLICATIONS

Extended European Search Report dated Jul. 11, 2017, by EPO, re European Patent Application No. 17157557. 14 pages.

*Primary Examiner* — Hong Zhou
(74) *Attorney, Agent, or Firm* — Perry + Currier, Inc.

(57) ABSTRACT

OR-function illumination in phased bitplanes in a high dynamic range projector is provided, which can be used to reduce flicker artifacts. The projector comprises: a light source; a premod display; a prime display, the premod display configured to modulate light from the light source to illuminate the prime display; and, a computing device. The computing device drives the prime display according to a phased sequence to transition the prime display from a leading bitplane to a following bitplane. The computing device is further configured to, at least in a time period corresponding to the prime display being driven according to the phased sequence, drive adjacent pixel groups of the premod display according to an OR-function of premod versions of respective portions of each of at least the leading bitplane and the following bitplane.

20 Claims, 16 Drawing Sheets

(51) Int. Cl.
*G09G 3/00* (2006.01)
*G09G 3/20* (2006.01)
(58) Field of Classification Search
CPC .. H04N 5/7441; H04N 5/7458; H04N 9/3164; H04N 9/3108; H04N 9/3105; H04N 9/3126; H04N 9/315
See application file for complete search history.

(56) References Cited

U.S. PATENT DOCUMENTS

| | | | |
|---|---|---|---|
| 2005/0248555 A1 | 11/2005 | Feng et al. | |
| 2006/0164443 A1* | 7/2006 | Kettle | G09G 3/2022 345/690 |
| 2008/0158245 A1* | 7/2008 | Lieb | G09G 3/007 345/596 |
| 2008/0158641 A1* | 7/2008 | Lieb | G02B 6/0046 359/263 |
| 2011/0175926 A1 | 7/2011 | Geissler | |
| 2015/0036049 A1* | 2/2015 | Walker | G06F 3/1423 348/513 |
| 2016/0286178 A1* | 9/2016 | Shields | H04N 9/3126 |

* cited by examiner

| | Pixels change intensity | Duration halos precede or remain after pixels | Duration halos between pixels |
|---|---|---|---|
| Timing 1001 | Yes | 2*TP | 0 |
| Timing 1002 | No | TL + TPL - TP | |
| Timing 1101 | No | m*TP | |
| Timing 1201 | Yes | 3*TP | |
| Timing 1301 | No | 5*TP | |
| Timing 1501 | No | 2*TP | |

TABLE 1

Fig. 16

OR-FUNCTION ILLUMINATION IN PHASED BITPLANES IN A HIGH DYNAMIC RANGE PROJECTOR

FIELD

The specification relates generally to display systems, and specifically to OR-function illumination in phased bitplanes in a high dynamic range projector.

BACKGROUND

In a high contrast projector, a light source illuminates a "premod" DMD (e.g. a premodification digital micromirror device), which modulates light from the light source to form an image, which is in turn used to illuminate a prime DMD premod, bitplanes (images) at the premod DMD can be used to achieve selective illumination of the prime DMD, reducing black levels and increasing contrast. To allow faster switching of images, groups of DMD pixels can be updated instead of the entire DMD image, reducing the time to load the image data as only a portion of the DMD must be loaded with the image data. Switching a group of pixels (e.g. not the entire DMD) at a time is referred to as a "phased switch", whereas switching the entire DMD to a new image is referred to as a "global switch".

A group of pixels can be switched twice in rapid succession to display a bitplane for a short period of time (e.g. as short as the time required to load image data into the pixel group); the bitplane displayed briefly is referred to as a "phased bitplane". However, when phased switching of bitplanes is used, artifacts can be introduced at pixel group boundaries due to incorrect illumination of prime DMD pixels in two ways: first, by the PSF (point spread function) spreading the image from premod DMD pixel groups configured for two different bitplanes across prime DMD pixels configured for a single bitplane; and second, by the PSF spreading the image from the premod DMD pixels, configured for a single bitplane, across prime DMD pixels configured for two different bitplanes. Specifically, a prime DMD pixel that is near the image of the premod pixel group boundary can be incorrectly illuminated by the PSF image from the premod DMD as the premod pixel groups on either side of the premod pixel group boundary switches from a first bitplane to a second bitplane in a phased manner. For DMDs, where the pixels can be grouped in 15 to 16 horizontal bands, the artifacts can be clustered around 14 or 15 horizontal lines in a projected image which can be noticeable to the human visual system.

SUMMARY

In general, this disclosure is directed to a high contrast, high dynamic range projector with a premod display and a prime display. For example, the displays can comprise respective DMDs (digital micromirror devices) and/or respective LCOS (liquid crystal on silicon) displays, and the like. The prime display is driven according to a phased sequence to transition the prime display from a leading bitplane to a following bitplane. At least in a time period corresponding to the prime display being driven according to the phased sequence, the premod display is driven according to an OR-function of premod versions of respective portions of each of at least the leading bitplane and the following bitplane. Each of the premod versions can comprise blurred versions of the respective portions of each of at least the leading bitplane and the following bitplane; alternatively, blurring of the premod versions can be performed using optics between the premod display and the prime display. However, in other implementations, such optics can simply transfer and/or convey the premod versions from the premod display to the prime display without necessarily blurring the premod versions, though registration may not be perfect. In some implementations, the phased sequence includes a phased bitplane between the leading bitplane and the following bitplane and the adjacent pixel groups of the premod display are driven according to the OR-function of the premod versions of respective portions of the leading bitplane, the phased bitplane and the following bitplane, at least in the time period corresponding to the prime display being driven according to the phased bitplane. Either way, the premod display can be driven according to the OR-function which can cause all the pixels in the prime display, in all the prime bitplanes, to be illuminated correctly. In some implementations, the premod display is globally switched to a premod bitplane comprising the OR-function of premod and/or blurred versions of each of corresponding bitplanes used to drive the prime display. In some of these implementations, the premod display is also driven according to a global premod OR-ed bitplane during respective time periods of each of the prime display being driven according to the leading bitplane and the following bitplane. In yet further implementations, the premod display is also driven according to a respective phased premod OR-ed bitplane at least in a time period corresponding to the prime display being switched in a phased manner between bitplanes; specifically, adjacent pixel groups of the premod display are driven in a respective sequence across the premod display according to a phased premod bitplane comprising the OR-function of the corresponding pixel groups in each of the first premod bitplane, the phased premod bitplane and the following premod bitplane, driven in a respective sequence.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a projector comprising: a light source; a premod display; a prime display, the premod display configured to modulate light from the light source to illuminate the prime display; and, a computing device configured to: drive the prime display according to a phased sequence to transition the prime display from a leading bitplane to a following bitplane; and, at least in a time period corresponding to the prime display being driven according to the phased sequence, drive adjacent pixel groups of the premod display according to an OR-function of premod versions of respective portions of each of at least the leading bitplane and the following bitplane.

The OR-function of the premod versions of the respective portions of each of at least the leading bitplane, and the following bitplane can comprise the OR-function of premod versions of each of corresponding bitplanes used to drive the prime display.

The premod versions of each of corresponding bitplanes used to drive the prime display can comprise blurred versions of each of corresponding bitplanes used to drive the prime display.

The projector can further comprising optics configured to one or more of convey images in the light conveyed from the premod display to the prime display and blur images in the light conveyed from the premod display to the prime display.

The computing device can be further configured to drive the premod display according to a global premod bitplane during respective time periods of the prime display being driven according to the leading bitplane and the following bitplane.

Each of the adjacent pixel groups of the premod display can be driven according to a phased premod bitplane and are driven for a longer time period than each of corresponding pixel groups of the prime display. Each of the adjacent pixel groups of the premod display, can be driven according to a phased premod bitplane and for a time period which: starts at a beginning of an earliest driving period of a corresponding adjacent pixel group of the prime display; and ends at a respective ending of a latest following driving period of a corresponding adjacent following prime pixel group of the prime display. A first pixel group of the adjacent pixel groups of the premod display can be driven for a respective time period which: begins during the prime display being driven according to the leading bitplane; and ends at a respective ending of a second driving period of a corresponding second prime pixel group of the prime display. A last pixel group of the adjacent pixel groups of the premod display can be driven for a respective time period which: starts at a respective beginning of a second-last driving period of a corresponding previous pixel group of the prime display; and ends during the prime display being driven according to the following bitplane.

The phased sequence can comprise a phased bitplane and the adjacent pixel groups of the premod display can be driven according to the OR-function of the premod versions of respective portions of the leading bitplane, the phased bitplane and the following bitplane, at least in the time period corresponding to the prime display being driven according to the phased bitplane. The computing device can be further configured to: at least in the time period corresponding to the prime display being driven according to the phased bitplane, drive the adjacent pixel groups of the premod display in a respective sequence across the premod display according to a phased premod bitplane, wherein each portion of the phased premod bitplane comprises the OR-function of premod versions of corresponding portions of each of the leading bitplane, the phased bitplane and the following bitplane.

The OR-function of the premod versions used to drive the premod display can include dither patterns.

The adjacent pixel groups can comprise adjacent reset groups.

Each of the premod display and the prime display can comprise one or more of a DMD (digital micromirror device) and an LCOS (liquid crystal on silicon) display.

The projector can further comprise cascade optics configured to convey modulated light from the premod display to the prime display.

Another aspect of the specification provides a method comprising: at a projector comprising: a light source; a premod display; a prime display, the premod display configured to modulate light from the light source to illuminate the prime display, and a computing device, driving, using the computing device, the prime display according to a phased sequence to transition the prime display from a leading bitplane to a following bitplane; and, at least in a time period corresponding to the prime display being driven according to the phased sequence, driving, using computing device, adjacent pixel groups of the premod display according to an OR-function of premod versions of respective portions of each of at least the leading bitplane and the following bitplane.

The OR-function of the premod versions of the respective portions of each of at least the leading bitplane, and the following bitplane can comprise the OR-function of premod versions of each of corresponding bitplanes used to drive the prime display.

The premod versions of each of corresponding bitplanes used to drive the prime display can comprise blurred versions of each of corresponding bitplanes used to drive the prime display.

The projector can further comprising optics configured to one or more of convey images in the light conveyed from the premod display to the prime display and blur images in the light conveyed from the premod display to the prime display.

The method can further comprise driving the premod display according to a global premod bitplane during respective time periods of the prime display being driven according to the leading bitplane and the following bitplane.

Each of the adjacent pixel groups of the premod display can be driven according to a phased premod bitplane and are driven for a longer time period than each of corresponding pixel groups of the prime display. Each of the adjacent pixel groups of the premod display, can be driven according to a phased premod bitplane and for a time period which: starts at a beginning of an earliest driving period of a corresponding adjacent pixel group of the prime display; and ends at a respective ending of a latest following driving period of a corresponding adjacent following prime pixel group of the prime display. A first pixel group of the adjacent pixel groups of the premod display can be driven for a respective time period which: begins during the prime display being driven according to the leading bitplane; and ends at a respective ending of a second driving period of a corresponding second prime pixel group of the prime display. A last pixel group of the adjacent pixel groups of the premod display can be driven for a respective time period which: starts at a respective beginning of a second-last driving period of a corresponding previous pixel group of the prime display; and ends during the prime display being driven according to the following bitplane.

The phased sequence can comprise a phased bitplane and the adjacent pixel groups of the premod display can be driven according to the OR-function of the premod versions of respective portions of the leading bitplane, the phased bitplane and the following bitplane, at least in the time period corresponding to the prime display being driven according to the phased bitplane. The method can further comprise: at least in the time period corresponding to the prime display being driven according to the phased bitplane, driving the adjacent pixel groups of the premod display in a respective sequence across the premod display according to a phased premod bitplane, wherein each portion of the phased premod bitplane comprises the OR-function of premod versions of corresponding portions of each of the leading bitplane, the phased bitplane and the following bitplane.

The OR-function of the premod versions used to drive the premod display can include dither patterns.

The adjacent pixel groups can comprise adjacent reset groups.

Each of the premod display and the prime display can comprise one or more of a DMD (digital micromirror device) and an LCOS (liquid crystal on silicon) display.

The projector can further comprise cascade optics configured to convey modulated light from the premod display to the prime display.

Another aspect of the specification provides a non-transitory computer-readable medium storing a computer program, wherein execution of the computer program is for: at projector comprising: a light source; a premod display; a prime display, the premod display configured to modulate light from the light source to illuminate the prime display, and a computing device, driving, using the computing device, the prime display according to a phased sequence to transition the prime display from a leading bitplane to a following bitplane; and, at least in a time period corresponding to the prime display being driven according to the phased sequence, driving, using computing device, adjacent pixel groups of the premod display according to an OR-function of premod versions of respective portions of each of at least the leading bitplane and the following bitplane.

The OR-function of the premod versions of the respective portions of each of at least the leading bitplane, and the following bitplane can comprise the OR-function of premod versions of each of corresponding bitplanes used to drive the prime display.

The premod versions of each of corresponding bitplanes used to drive the prime display can comprise blurred versions of each of corresponding bitplanes used to drive the prime display.

The projector can further comprising optics configured to one or more of convey images in the light conveyed from the premod display to the prime display and blur images in the light conveyed from the premod display to the prime display.

Execution of the computer program can be further for driving the premod display according to a global premod bitplane during respective time periods of the prime display being driven according to the leading bitplane and the following bitplane.

Each of the adjacent pixel groups of the premod display can be driven according to a phased premod bitplane and are driven for a longer time period than each of corresponding pixel groups of the prime display. Each of the adjacent pixel groups of the premod display, can be driven according to a phased premod bitplane and for a time period which: starts at a beginning of an earliest driving period of a corresponding adjacent pixel group of the prime display; and ends at a respective ending of a latest following driving period of a corresponding adjacent following prime pixel group of the prime display. A first pixel group of the adjacent pixel groups of the premod display can be driven for a respective time period which: begins during the prime display being driven according to the leading bitplane; and ends at a respective ending of a second driving period of a corresponding second prime pixel group of the prime display. A last pixel group of the adjacent pixel groups of the premod display can be driven for a respective time period which: starts at a respective beginning of a second-last driving period of a corresponding previous pixel group of the prime display; and ends during the prime display being driven according to the following bitplane.

The phased sequence can comprise a phased bitplane and the adjacent pixel groups of the premod display can be driven according to the OR-function of the premod versions of respective portions of the leading bitplane, the phased bitplane and the following bitplane, at least in the time period corresponding to the prime display being driven according to the phased bitplane. Execution of the computer program can be further for: at least in the time period corresponding to the prime display being driven according to the phased bitplane, driving the adjacent pixel groups of the premod display in a respective sequence across the premod display according to a phased premod bitplane, wherein each portion of the phased premod bitplane comprises the OR-function of premod versions of corresponding portions of each of the leading bitplane, the phased bitplane and the following bitplane.

The OR-function of the premod versions used to drive the premod display can include dither patterns.

The adjacent pixel groups can comprise adjacent reset groups.

Each of the premod display and the prime display can comprise one or more of a DMD (digital micromirror device) and an LCOS (liquid crystal on silicon) display.

The projector can further comprise cascade optics configured to convey modulated light from the premod display to the prime display.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 16 depicts a Table 1 which includes a summary of the driving schemes described herein, according to non-limiting implementations.

DETAILED DESCRIPTION

Present implementations include a cascading display projector. Each display described herein can comprise a DMD (digital micromirror device), an LCOS (liquid crystal on silicon) display and the like. In general, in such systems, a premod display is illuminated by light from a light source which, in turn, is imaged onto a prime display, for example using cascading optics. As such, each of the premod display and the prime display can comprise a respective reflective display. In general, the premod display and the prime display are simultaneously driven using similar bitplanes, however, the bitplane used to drive the premod display can be a modified and/or blurred version of the bitplane used to drive the prime display. Such a cascading display system can be used in a high contrast, high dynamic range projector as only pixels of the prime display that are in an "on" state are illuminated by light from the premod display, as well as small groups of pixels surrounding the "on" pixel (as imaging optics between the premod and prime may cause more than one premod pixel to contribute to the illumination of a prime pixel). However, when each of the prime display and the premod display are driven according to a phased sequence to transition the prime display from a leading bitplane to a following bitplane (which can include the use of phased bitplanes to better render least significant bits of an image), artifacts (including, but not limited to, flicker artifacts) can occur between the pixel groups that are driven in phase during the time period of the phased sequence.

In this specification, several scenarios of the phased sequence at the prime display are considered; specifically, the inclusion and exclusion of a phased bitplane between a leading bitplane and a following bitplane in the phased sequence.

Implementations that include a phased bitplane between a leading bitplane and a following bitplane in the phased sequence at the prime display are described first with regards to FIGS. 1 to 13.

Figure 1:
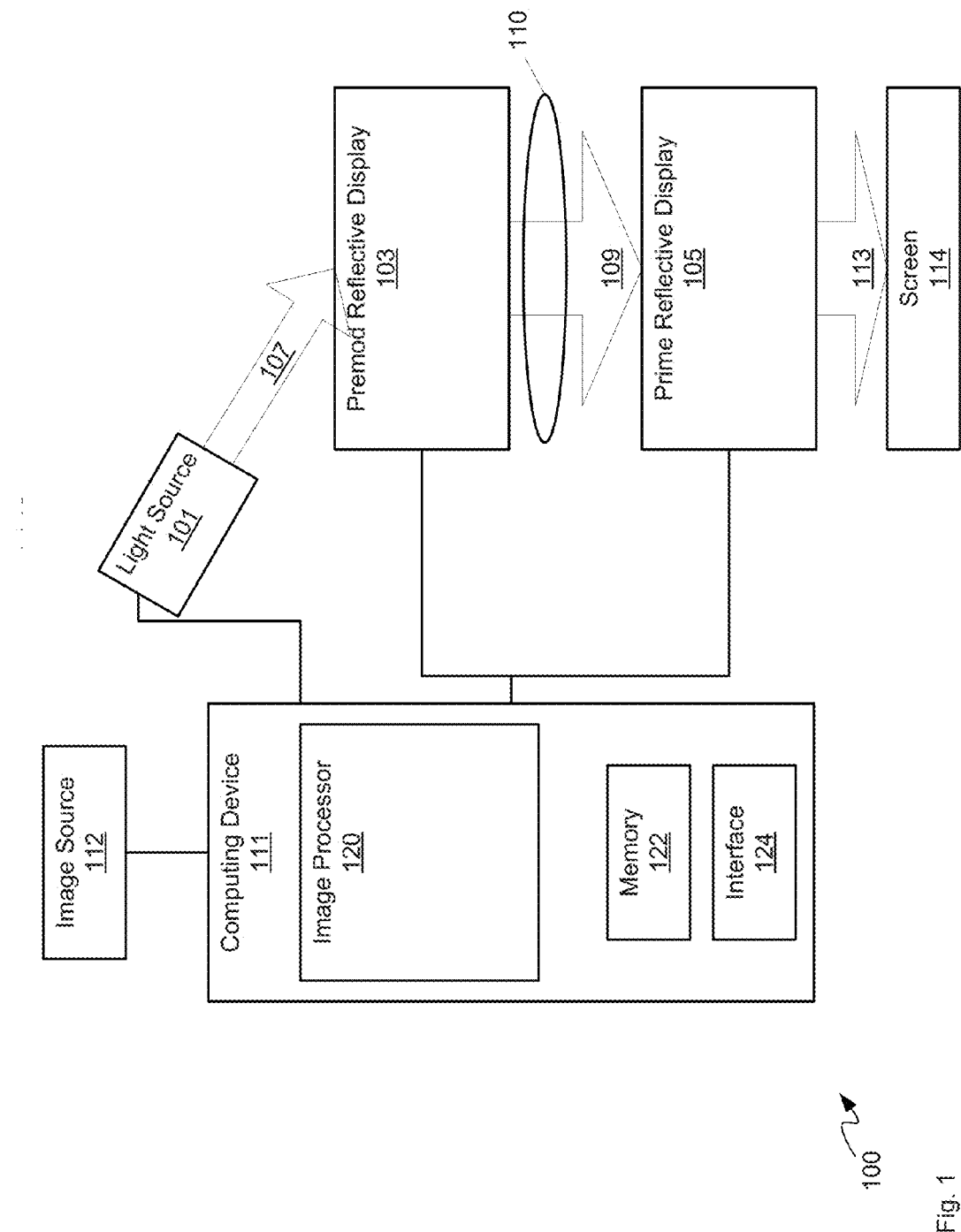
FIG. 1 depicts a schematic block diagram of a high dynamic range projector, according to non-limiting implementations.

Hence, attention is next directed to FIG. 1 which depicts a projector 100 comprising: a light source 101; a premod display 103; a prime display 105, premod display 103 configured to image light 107 from light source 101 to illuminate prime display 105 (e.g. with an image 109 formed by cascade optics 110); and, a computing device 111 configured to: drive prime display 105 according to a sequence comprising of a leading bitplane, a phased bitplane and a following bitplane; and, at least in a time period corresponding to prime display 105 being driven according to the phased bitplane, drive adjacent pixel groups of premod display 103 according to an OR-function of premod and/or blurred versions of respective portions of each of the leading bitplane, the phased bitplane and the following bitplane.

Premod display 103 and prime display 105 will be interchangeably referred to hereafter, collectively, as displays 103, 105 and/or individually as display 103 and display 105.

Furthermore, the geometry of light source 101, and displays 103, 105 appreciated to be only schematically depicted in FIG. 1, and it is understood that each of light source 101, and displays 103, 105 are arranged to effect the illumination as described herein.

In particular, projector 100 can further comprise optics 110 which convey images 109 and/or modulated light from premod display 103 to prime display 105; in some of these implementations, optics 110 can further be referred to as cascade optics since optics 110 cascade light 107 from premod display 103 to prime display 105 in the form of images 109 resulting in an image 113 observable by a viewer (not depicted) and/or projected onto a screen 114. Further, in some of these implementations, optics 110 can further defocus and/or blur images 109. In some implementations optics 110 can blur and/or further blur images formed by premod display 103, as described in more detail below. However, in other implementations, optics 100 can simply transfer and/or convey images formed by premod display 103 from premod display 103 to prime display 105 without necessarily blurring the images, though registration and/or alignment may not be perfect.

As depicted, projector 100 further comprises an image source 112 which, in some implementations, can be combined with computing device 111. Image source 112 is generally configured to provide one or more image files to computing device 111 that defines output intensity values for each pixel in each frame of the one or more images. Image source 112 can be local or remote from computing device 111, in wireless and/or wired communication therewith, and can comprise a memory device storing image files, a broadcast device broadcasting image files, a media player that plays media storing image files (such as a DVD (digital versatile disc) player and/or a Bluray™ player and/or gaming device, etc.) and the like.

While not depicted, projector 100 can further comprise other components such as a chassis, one or more input devices, and the like that corresponding to mechanical functionality and/or electronic functionality of projector 100, depending on specific implementations thereof.

Computing device 111 generally comprises an image processor 120 (interchangeably referred to herein as processor 120), a memory 122 and a communications interface 124 (interchangeably referred to hereafter as interface 124). Processor 120 can comprise a processor and/or a plurality of processors, including but not limited to one or more central processors (CPUs) and/or one or more processing units and/or one or more graphic processing units (GPUs); either way, image streaming processor 120 comprises a hardware element and/or a hardware processor. Indeed, in some implementations, processor 120 can comprise an ASIC (application-specific integrated circuit) and/or an FPGA (field-programmable gate array) specifically configured to implement the functionality of computing device 111. Hence, computing device 111 is not necessarily a generic computing device, but a device specifically configured to implement specific functionality including controlling premod display 103 to provide bitplanes according to an OR-function. For example, computing device 111 and/or image streaming processor 120 can specifically comprise an engine configured to provide bitplanes according to an OR-function to drive premod display 103.

Processor 120 is configured to communicate with memory 122 which can comprise a non-volatile storage unit (e.g. Erasable Electronic Programmable Read Only Memory ("EEPROM"), Flash Memory) and/or a volatile storage unit (e.g. random access memory ("RAM")). Programming instructions that implement the functional teachings of computing device 111, and/or projector 100, as described herein can be maintained, persistently, in memory 122 and used by processor 120 which makes appropriate utilization of volatile storage during the execution of such programming instructions. Those skilled in the art will now recognize that memory 122 is an example of a computer-readable medium, and in particular a non-transitory computer-readable medium, storing a computer program, wherein execution of the computer program is for configuring the processor 120 as described herein. Furthermore, memory 122 is also an example of a memory unit and/or memory module.

In general, when processor 120 processes such instructions stored at memory 122, computing device 111 is configured to: drive prime display 105 according to a sequence comprising of a leading bitplane, a phased bitplane and a following bitplane; and, at least in a time period corresponding to prime display 105 being driven according to the phased bitplane, drive adjacent pixel groups of premod display 103 according to an OR-function of premod and/or blurred versions of respective portions of each of the leading bitplane, the phased bitplane and the following bitplane.

Interface 124, can be implemented as one or more connectors and/or network adaptors and/or radios, configured to communicate in a wired and/or wireless manner with displays 103, 105 (and image source 112 when present), for example using cables and/or one or more communication networks and/or one or more communication links and/or one or more communication buses. It will be appreciated that interface 124 can be configured to correspond with communication architecture that is used to implement cables and/or one or more communication networks and/or one or more communication links and/or one or more communication buses.

Light source 101 can comprise one or more light sources suitable for use in projector applications including, but not limited to, one or more laser light sources, one or more lamp sources, LED light sources and the like. In particular, light source 101 can comprise a three-colour light source system that can illuminate premod display 103 in a sequence, for example, red, green and blue. However, light source 101 can also comprise a single colour light source; in these implementations projector 100 can comprise three light sources (i.e. light source 101 and two additional light sources), one for each of red, green and blue.

Each of displays 103, 105 comprises a display (and/or a reflective display) including, but not limited to DMDs, LCOS displays, and the like. In particular, each pixel in each display 103, 105 can be at least partially changed between two states. For example, DMDs comprise a plurality of micromirrors each of which can be in an on-position or an off-position, depending on whether a corresponding pixel in an image to be projected is "on" or "off". Similarly, in LCOS displays, each pixel can be changed between an on-state and an off-state, however with LCOS a pixel can be in a partial state.

Furthermore, when light source 101 comprises three light sources, projector 100 can comprise additional sets of a premod display and a prime display, one for each light source, as well as projection optics that combine images from each set of displays. However, when light source 101 comprises three light sources, the light sources can be arranged to illuminate premod display 103 in a sequence.

Regardless, in general, light source 101 illuminates premod display 103 with light 107. Furthermore, computing device 111 drives premod display 103 to form premod bitplanes, for example blurred versions of prime bitplanes, while driving prime display 105 to form image bitplanes. However, blurring of images formed by premod display 103 can also occur using optics 110. Hence, transformed and/or blurred versions of premod images (e.g. by optics 110 and/or by image processor 120) are used to illuminate prime display 105 (i.e. images 109) via optics 110, the transformed versions of images 109 being formed by premod display 103 conveyed to prime display 105; for example, premod display 103 can reflect light 107 onto prime display 105, light 107 being modulated by premod display to form images 109 when reflected to prime display 105. Hence, only areas that "need" light on prime display 105 are illuminated, which increases the contrast of projector 100. It is further appreciated that the premod bitplanes can comprise dither patterns; specifically, the OR-function of the premod and/or blurred versions used to drive the premod display can include dither patterns, for example to control brightness of images 113.

Hence, the term "premod" refers to "premodulator" as premod display 103 "pre-modulates" light source 101 illuminating prime display 105, which is the "primary" modulator used to form an image projected by projector 100.

However, this geometry can lead to artifacts, including, but not limited to flicker artifacts, when prime display 105 is being driven according a phased bitplane and/or transitioning, in a phased sequence, between a leading bitplane and a following bitplane.

Figure 2:
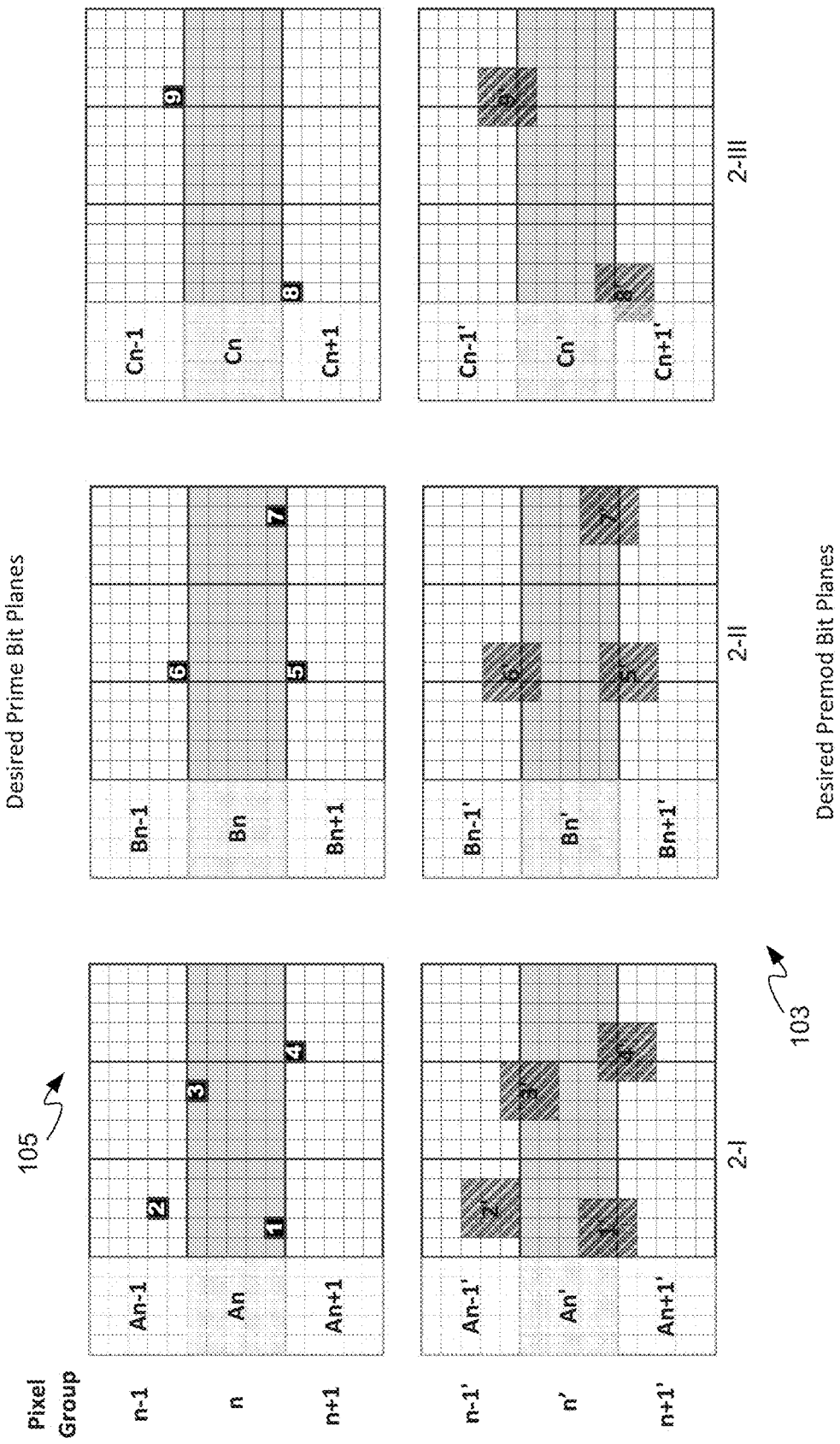
FIG. 2 depicts a portion of each of a prime display and premod display, of the projector of FIG. 1, being driven in a sequence, according to non-limiting implementations.

Attention is next directed to FIG. 2 which depicts three example bitplanes to be displayed on a portion of each of prime display 105 (in the top row) and premod display 103 (bottom row) in views 2-I, 2-II and 2-III. In particular, it is assumed in FIG. 2 that views 2-I, 2-II and 2-III represent a sequence of bitplanes used to drive each of displays 103, 105 in a sequence. While each display 103, 105 in FIG. 2, and throughout the present specification, is represented as a 15×15 matrix of pixels, it is appreciated that each display 103, 105 can be larger, and can include, but is not limited to, 4K displays and the like, though smaller resolution and larger resolution displays are within the scope of present implementations.

Specifically, first view 2-I shows bitplane A to be displayed on prime display 105 and the premod version bitplane A' to be displayed on premod display 103. It is assumed the image from premod display 103 is transformed by cascade optics 110 to illuminate prime display 105 as shown in view 3-I of FIG. 3, where the 3×3 blocks of "on" pixels (1', 2', 3' and 4' in the bottom row of view 2-I) in the premod bitplane A' (e.g. group of pixels 303) have yielded 5×5 patches of light (e.g. group of pixels 304) centered on the "on" prime pixels 1, 2, 3 and 4 in prime bitplane A; this will be described in more detail below.

Furthermore, in second view 2-II, the desired "on" pixels on prime display 105 have changed to locations 5, 6 and 7 in bitplane B, and a corresponding premod bitplane B' has been constructed with corresponding blocks of pixels 5', 6' and 7' to illuminate those pixels at locations 5, 6 and 7 of prime display 105.

Finally, in third view 2-III, the desired "on" pixels on prime display 105 have been changed to locations 8 and 9 in bitplane C, and a corresponding premod bitplane C' has been constructed with corresponding blocks of pixels 8' and 9' to illuminate those pixels at locations 8 and 9 of prime display 105.

In general, the premod bitplanes A', B' and C' are constructed to illuminate the prime bitplanes A, B and C, for example, using a premod and/or blurred version of the prime bitplanes. For example, in FIG. 2, when bitplane A is used to drive prime display 105, pixels 1, 2, 3, 4 are assumed to be "on", and the remainder of the pixels of bitplane A are assumed to be "off"; furthermore when bitplane A' is used to drive premod display 103, groups of pixels 1', 2', 3', 4', which correspond to pixels 1, 2, 3, 4, are assumed to be "on", and the remainder of the pixels of bitplane A' are assumed to be "off". In particular, each group of pixels 1', 2', 3', 4' is positioned and sized to illuminate corresponding pixels 1, 2, 3, 4; for example, when cascade optics 110 transforms an "on" pixel of premod display 103 into a patch of light covering a 3×3 group of pixels centered on the same pixel on prime display 105, then each group of pixels 1', 2', 3', 4' comprises a 3×3 group of pixels centred on a corresponding location of a corresponding single pixel 1, 2, 3, 4 such that an image of bitplane A' illuminating prime display 105 fully illuminates the pixels 1, 2, 3, 4. Furthermore, to fully illuminate a pixel on prime display 105, cascade optics 110 can spread each pixel of a premod image into 3×3 patches of light, and all pixels within a corresponding a 3×3 patch on at prime display 105 can be illuminated, as the patches of light resulting from each of those premod pixels will contribute to the illumination of the desired prime pixel.

Similarly, for "on" pixels 5, 6, 7 in bitplane B of prime display 105, corresponding "on" groups of pixels 5', 6', 7' of premod display 103 comprises 3×3 groups of pixels centered on a corresponding location in bitplane B'. And for "on" pixels 8, 9 in bitplane C of prime display 105, corresponding "on" groups of pixels 8', 9' of premod display 103 comprises 3×3 groups of pixels centered on a corresponding location in bitplane C'.

As described herein, a bitplane comprises data used to drive a display to form an image; in particular a bitplane comprises a set of bits can correspond to a given bit position in each of binary numbers representing a signal; for example, in imaging, a first bitplane in a sequence can contain a set of most significant bits of a set of binary numbers, and last bitplane in the sequence can comprise a set of least significant bits of the set of binary numbers. When driving displays, each bitplane comprises an array used to drive each pixel in the display for a given time period, where longer time periods are used to represent most significant bits, and shorter time periods are used to represent least significant bits.

A global bitplane comprises a bitplane that is used to drive an entire display all at once, at least for a given time period based on a desired brightness level of the image to be formed by the global bitplane.

Similarly, a phased bitplane comprises a bitplane that is used to drive a display in phases, and for shorter periods of time, as compared to global bitplanes; while global bitplanes can also be used to represent a least significant bit, due to the global refresh rate of a display, driving the display in phases shortens a time period over which a portion of the display is refreshed such that smaller least significant bits can be represented.

To represent phased bitplanes, a display can be divided into groups of pixels (which can also be referred to as reset groups), for example, groups of rows of horizontal pixels; as depicted in FIG. 2, each display 105 comprises three pixel groups labelled n−1, n, n+1, and each display 103 comprises three corresponding pixel groups labelled n−1', n', n+1'. Furthermore, each bitplane can be divided into portions to drive each pixel group (and/or reset group). For example, when prime display 105 transitions from bitplane A to phased bitplane B, pixel group n−1 is changed from being driven by bitplane portion An−1 to being driven by bitplane portion Bn−1; then pixel group n is changed from being driven by bitplane portion An to being driven by bitplane portion Bn, etc. In general, each bitplane portion, as referred to herein, corresponds to a portion of a bitplane used to drive a respective pixel group. The time that a particular pixel group takes to load can be referred to a group load period, and is generally much shorter than the time required to load all pixels on the display.

Figure 10:
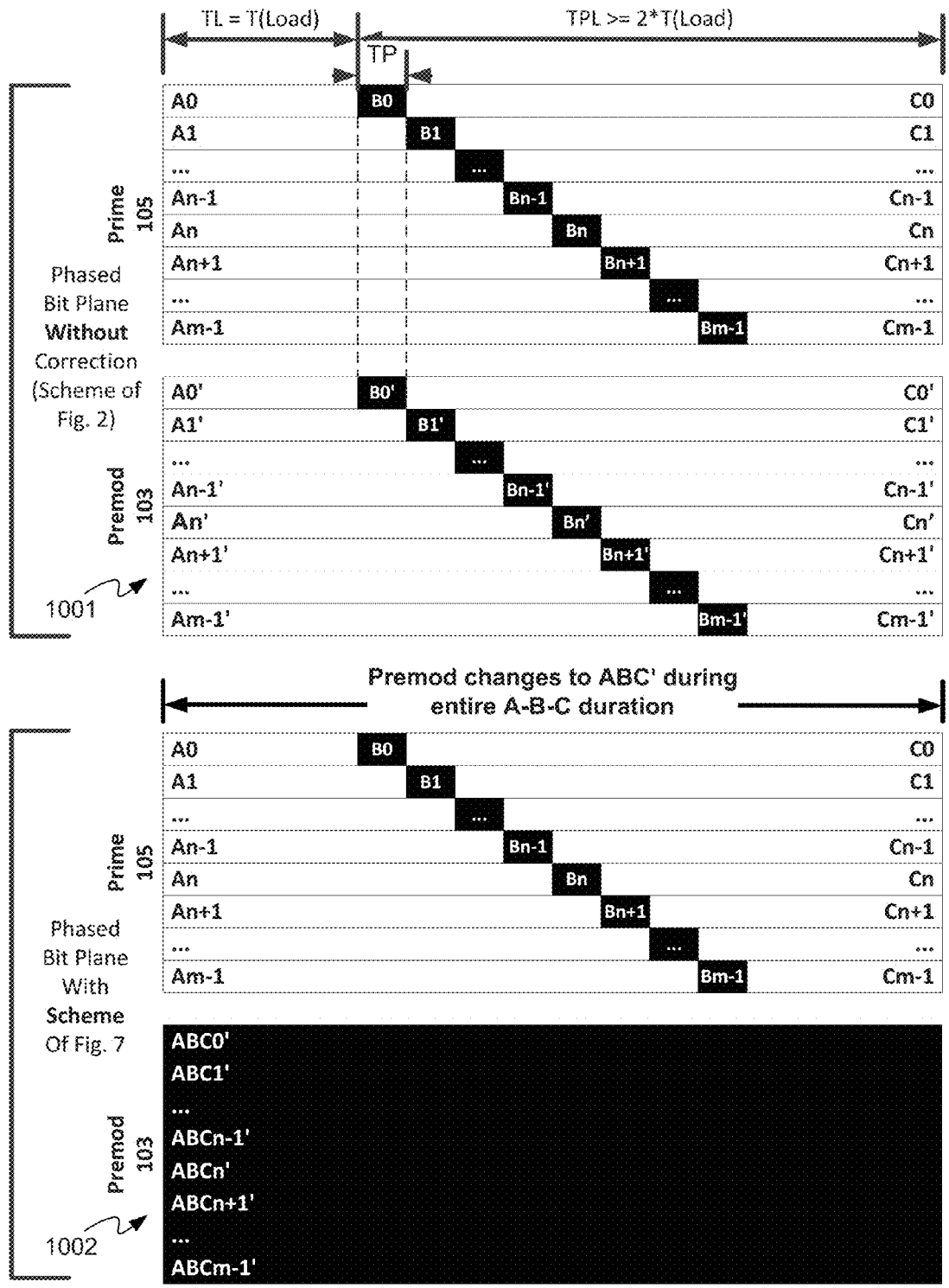
FIG. 10 depicts timing diagrams of the driving scheme of FIGS. 2 and 7, according to non-limiting implementations.

Hence, display 105 is transitioned from bitplane A to bitplane B to bitplane C in a phased sequence over a period of time (e.g. as depicted in timing 1001 of FIG. 10). Furthermore, when pixel group n is changed from being driven by bitplane portion An to being driven by bitplane portion Bn, pixel group n−1 is changed from being driven by bitplane portion Bn−1 to being driven by bitplane portion Cn−1. Pixel group n is then loaded with bitplane portion Cn, and once loaded it may be changed from being driven by bitplane portion Bn to being driven by bitplane portion Cn. Thus, the duration of time that pixel group n displays a portion of bitplane B is at least a group load period.

Similarly, when premod display 103 transitions from bitplane A' to bitplane B' to bitplane C', pixel group n−1' is changed from being driven by bitplane portion An−1' to being driven by bitplane portion Bn−1', etc. In other words, the phasing of bitplanes on premod display 103 for a phased bitplane is similar to that described above.

Furthermore, while in FIG. 2, each of displays 103, 105 are depicted as being driven by respective bitplane B, B', as if each were global bitplanes, it is understood that each adjacent pixel group may be driven in a phased manner, for example as described below with respect to FIG. 3.

When optics 110 blurs the image formed from bitplane A', each pixel within the 3×3 "on" pixel groups (e.g. see group of pixels 303 in FIG. 3) illuminates a 3×3 patch on the prime display 105, resulting in a 5×5 area of illumination (e.g. see group of pixels 304 in FIG. 3), each centered on a respective pixel 1, 2, 3, 4.

In any event, for pixels in bitplanes of prime display 105 that are close to boundaries of premod pixel groups, during the display period (e.g. at least a load period) of a phased bitplane, artifacts, including but not limited to flicker artifacts, can occur due to the corresponding groups of pixels from premod display 103 straddling pixel groups.

For example, as shown in FIG. 2, the group of pixels 3' clearly straddles bitplane portions An−1', An', and the groups of pixels 1', 4' clearly straddle bitplane portions An', An+1'. Similarly, the group of pixels 6' clearly straddles bitplane portions Bn−1', Bn', and the groups of pixels 5', 7' clearly straddle bitplane portions Bn', Bn+1'. Similarly, the group of pixels 9' clearly straddles bitplane portions Cn−1', Cn', and the group of pixels 8' clearly straddles bitplane portions Cn', Cn+1'. Hence, for each of the groups of pixels 1', 3,' 4', 5', 6', 7', 8', 9', during the phased bitplane time period, a portion of each group of pixels 1', 3,' 4', 5', 6', 7', 8', 9' will be either "on" or "off" when the corresponding pixel in an adjacent pixel group are in an opposite state.

Figure 3:
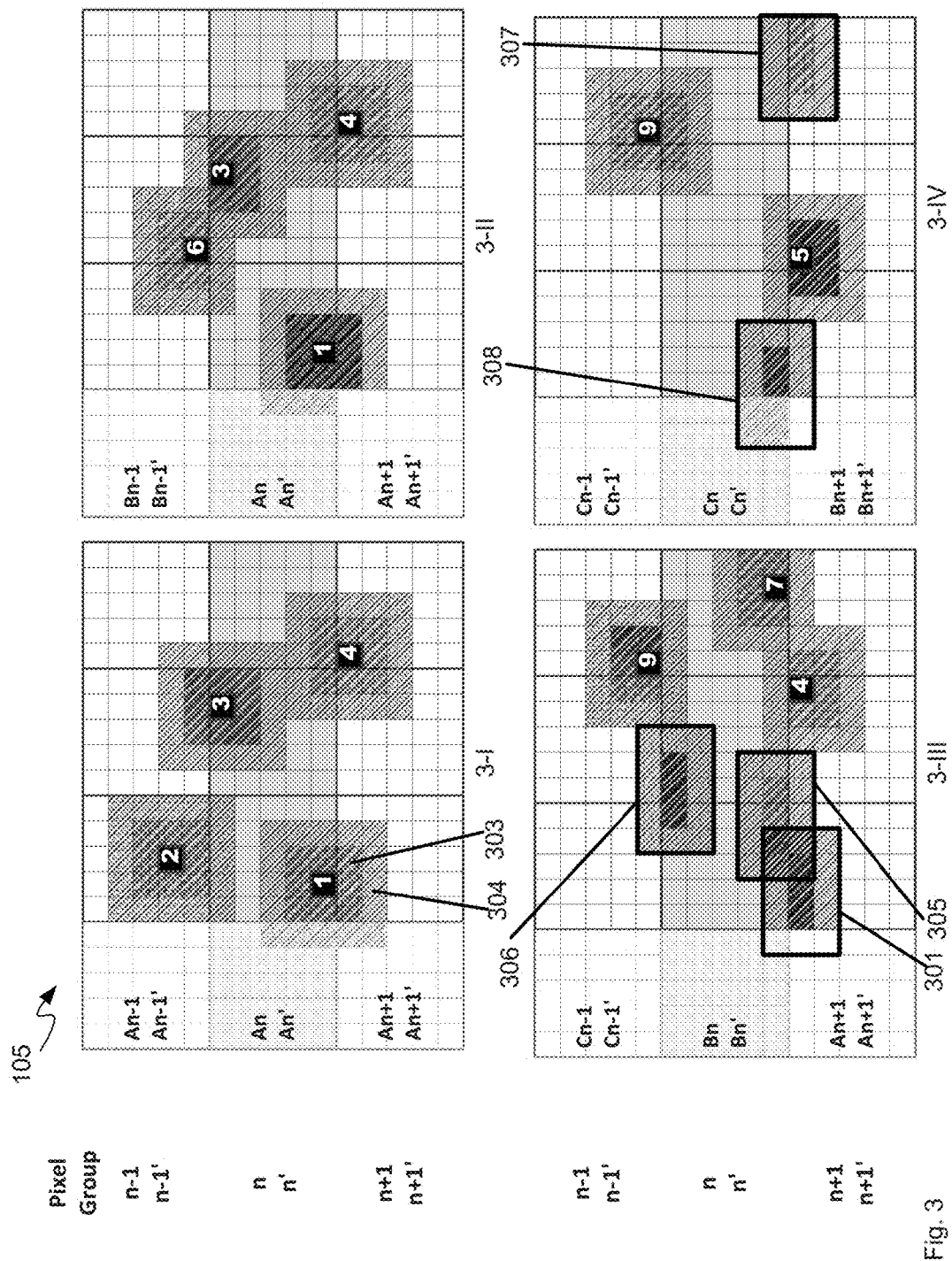
FIG. 3 depicts images formed by the premod display illuminating the prime display, of the projector of FIG. 1, in a sequence, according to non-limiting implementations.

This situation is further depicted in FIG. 3 which depicts images formed by premod display 103 illuminating prime display 105 in a sequence of views 3-I, 3-II, 3-III, 3-IV as the pixel groups of display 103 and display 105 are phased from bitplane A to bitplane B, and to bitplane C. Furthermore, it is assumed that the sequence of FIG. 3 continues after view 3-IV in a similar manner as described below with respect to views 3-I, 3-II, 3-III, 3-IV.

Positions of the horizontal pixel groups n−1, n, n+1 are also indicated, as well as positions of the pixel groups n−1', n', n+1' that form each of the images from premod display 103. In particular, a position of a pixel group of display 105 is indicated by a corresponding bitplane portion being used to drive a pixel group; furthermore, a bitplane portion being used to drive a corresponding pixel group of premod display 103 is indicated beneath each pixel group position. Hence, in view 3-I, a top row of prime display 105 corresponds to pixel group n−1, which is being driven by bitplane portion An−1; furthermore, pixel group n−1 is being illuminated by an image which is being produced by pixel group n−1', of premod display 103, being driven using bitplane portion An−1'. This convention will be used throughout the present specification.

The images formed by premod display 103 are further referred to by their corresponding bitplane portions An−1', An', An+1', and are shown as shaded areas surrounding each of corresponding pixels 1, 2, 3, 4, 5, 6, 7, 8, 9 of prime display 105, which are depicted in sold black. For example, in view 3-I the 3×3 group of pixels 303 centered on pixel 1 represents group of pixels 1' of bitplane portion An−1' of view 2-I. Furthermore, the larger group of 5×5 pixels 304 also centered on pixel 1 (and encompassing the 3×3 group of pixels) represents the group of pixels illuminated on display 105 by the group of pixels 1' of bitplane portion An−1' after being further blurred by optics 110. It is noted that pixels 304 spill off an edge of depicted portions of prime display 105.

It is clear from FIG. 3 that either the 3×3 group of pixels, and/or the 5×5 group of illuminated pixels, for each corresponding pixel on prime display 105, straddles boundaries of pixel groups.

In view 3-II, prime bitplane portion An−1 has been replaced with bitplane portion Bn−1, and similarly premod bitplane portion An−1' has been replaced with bitplane portion Bn−1' such that the corresponding illumination of prime display 105 pixel group n−1 in view 3-II results. As is clear in view 3-II, illumination of pixel 6 is incomplete as only a portion of the group of pixels 6' meant to illuminate pixel 6 is turned "on". Pixel 6 is illuminated by only a 2×3 group of premod pixels as the 3 pixels below the 2×3 group of pixels, each of which would contribute light to pixel 6 because of the transformation through optics 110, are not "on" on the premod display 103 because bitplane portion Bn' has not yet been turned "on". Illumination of pixel 3 is incomplete for similar reasons.

In view 3-III, prime bitplane portion An has been replaced with bitplane portion Bn, and similarly premod bitplane portion An' has been replaced with bitplane portion Bn'; however, as occurs in a phased bitplane time period, prime bitplane portion Bn−1 has been replaced with bitplane portion Cn−1, and similarly premod bitplane portion Bn−1' has been replaced with bitplane portion Cn−1'.

This situation again leads to illumination issues as after pixel 6 is turned "off" in pixel group n−1 (when prime bitplane portion Bn−1 is replaced with bitplane portion Cn−1) the prime display 105 is illuminated within the area 306 by premod display pixels turned on when bitplane portion An' is replaced with bitplane portion Bn', such that light appears at the boundary between pixel groups n−1 and n. Such an illumination area portion 306 creates a flicker artifact which can be noticeable to the human vision system.

Similarly, in view 3-III, pixel 1 is turned "off" in prime pixel group n (when bitplane An is replaced by bitplane Bn), but a corresponding illumination portion 301 remains from premod pixel group n+1' (which is still being driven by bitplane portion An+1'). Furthermore, an illumination portion 305 for pixel 5 in pixel group n appears early as pixel 5 has yet to be turned "on" according to bitplane portion Bn+1 in view 3-IV, but a portion 305 in adjacent pixel group n is turned "on" prior to pixel 5 being turned "on" as it is being driven by bitplane portion Bn' in view 3-III. While pixel 8 is not depicted, it is clear from FIG. 2 that pixel 8 in pixel group n+1 will be "on" when bitplane portion Bn+1 is replaced with bitplane portion Cn+1; however, in view 3-IV, a corresponding illumination portion 308 from bitplane n' illuminates prime display 105 prior to pixel 8 being turned "on", as premod bitplane portion Bn' is replaced with bitplane portion Cn.

Furthermore, in view 3-III illumination of pixels 4, 7 are each incomplete for similar reasons described above with reference to pixel 6, and a further illumination portion 307 for pixel 7 remains in view 3-IV.

In any event, each remaining illumination portion 301, 305, 306, 307, 308 that appear at boundaries between pixel groups, and each incomplete illumination of pixels adjacent pixel group boundaries, will cause flicker artifacts visible to the human vision system. Put another way, each illumination portion 301, 305, 306, 307, 308 comprises a blob of light on prime display 105 that is in turn reflected and/or conveyed towards a screen and/or a viewer that is not adjacent to, and/or associated with, any given pixel.

Figure 4:
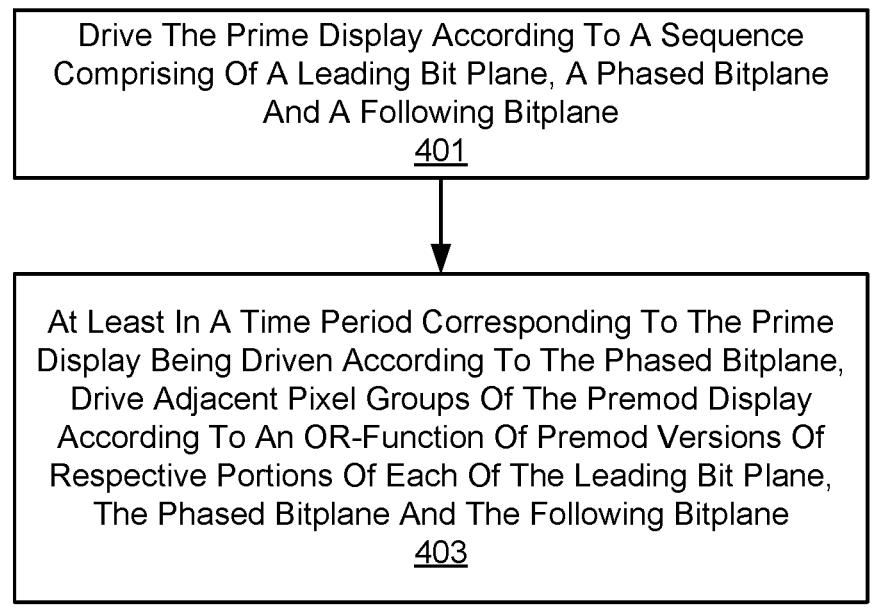
FIG. 4 depicts a schematic block diagram of a flowchart of a method operating the projector of FIG. 1 to reduce artifacts in phased bitplanes, according to non-limiting implementations.

Hence, attention is next directed to FIG. 4 which depicts a block diagram of a flowchart of a method 400 of operating projector 100 to reduce artifacts in phased bitplanes, according to non-limiting implementations. In order to assist in the explanation of method 400, it will be assumed that method 400 is performed using projector 100, and specifically by computing device 111, for example when processor 120 processes instructions stored at memory 122. Indeed, method 400 is one way in which projector 100 can be configured. Furthermore, the following discussion of method 400 will lead to a further understanding of projector 100, and its various components. However, it is to be understood that projector 100 and/or method 400 can be varied, and need not work exactly as discussed herein in conjunction with each other, and that such variations are within the scope of present implementations.

Regardless, it is to be emphasized, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of projector 100 as well.

At block 401, computing device 111 drives prime display 105 according to a sequence comprising of a leading bitplane, a phased bitplane and a following bitplane.

At block 403, computing device 111, at least in a time period corresponding to prime display 105 being driven according to the phased bitplane, drive adjacent pixel groups of premod display 103 according to an OR-function of premod and/or blurred versions of respective portions of each of the leading bitplane, the phased bitplane and the following bitplane.

Method 400 will now be described with reference to FIGS. 5 to 12.

Figure 5:
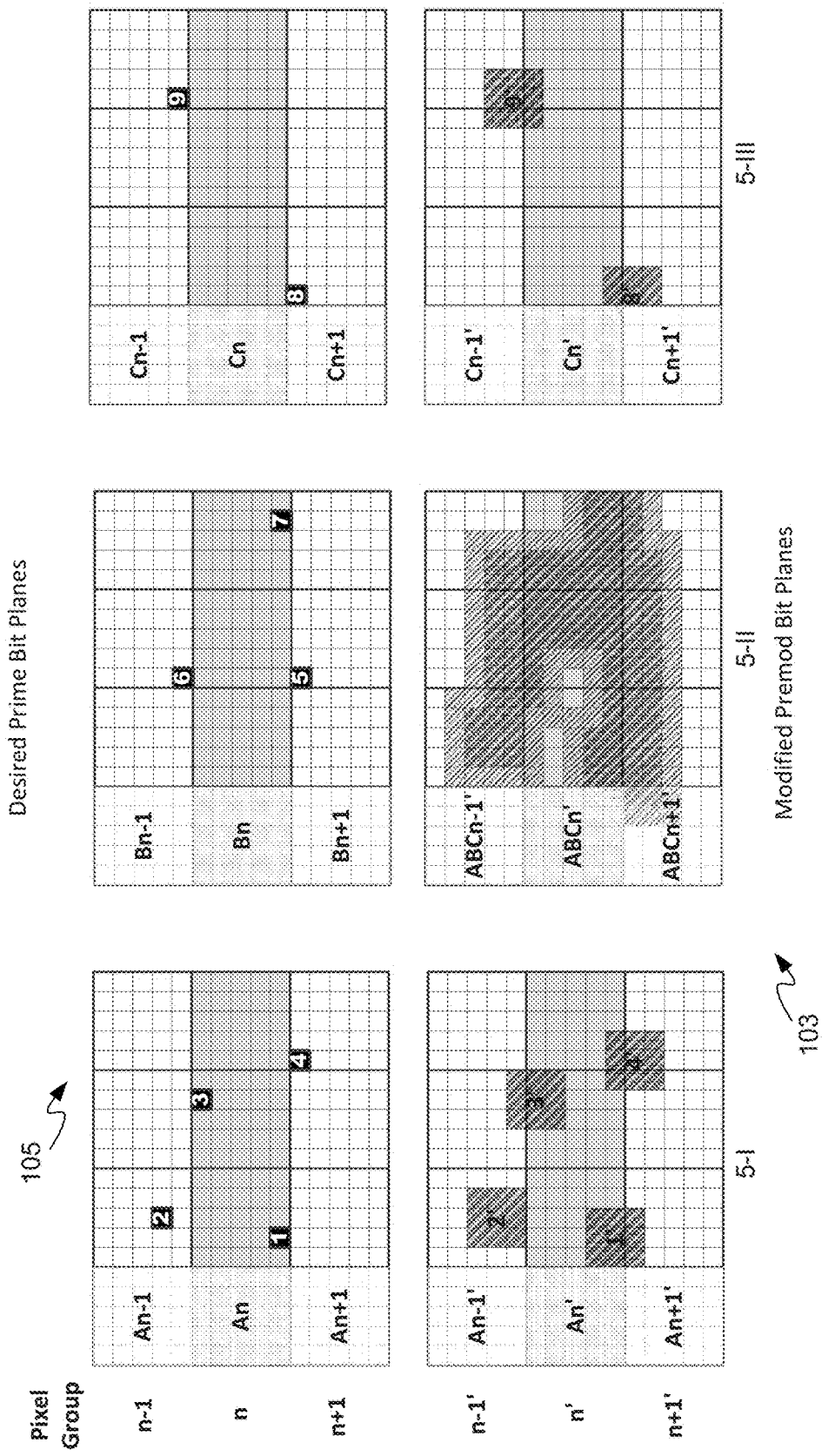
FIG. 5 depicts a portion of each of the prime display and the premod display, of the projector of FIG. 1, being driven in a sequence that includes an OR-function global bitplane at the premod display, according to non-limiting implementations.

Attention is next directed to FIG. 5, which is substantially similar to FIG. 2, with like elements having like numbers, and hence FIG. 5 depicts a sequence of views 5-I, 5-II, 5-III, as prime display 105 is being transitioned from being driven between bitplanes A, B, C, (e.g. as in block 401 of method 400). In each of views 5-I, 5-III premod display 103 is being driven according to respective bitplanes A', C', which are premod versions of respective bitplanes A, C, as described above.

However, in view 5-II, bitplane B' at premod display 103 has been replaced by a global bitplane ABC', represented by bitplane portions ABCn−1', ABCn', ABCn+1'. In particular, bitplane ABC comprises a bitplane derived from an OR-function of corresponding pixel groups in each of the premod and/or blurred versions of a sequence of the leading bitplane A, the phased bitplane B and the following bitplane C (e.g. as in block 403 of method 400).

For example, attention is again briefly directed to FIG. 2 and specifically to bitplane A', B', C' for premod display 103 depicted in each of views 2-I, 2-II, 2-III. Bitplane ABC' is derived from an OR-function of each of bitplanes A', B', C' which are, respectively, premod and/or blurred versions of each of bitplanes A, B, C.

Returning to FIG. 5, in the phased bitplane time period, i.e. when phased bitplane B is being used to drive a portion prime display 105, premod display 103 is driven with bitplane ABC'. As depicted, bitplane ABC' is switched onto premod display 103 using a global switch; for example, while in FIG. 3 premod display 103 is driven according to a phased bitplane B', comprising a premod and/or blurred version of phased bitplane B, in FIG. 5 phased bitplane B' is replaced with bitplane ABC' in all pixel groups such that adjacent pixel groups n−1', n', n+1' of premod display 103 are driven according to an OR-function of corresponding pixel groups n−1, n, n+1 in each of the premod versions of a sequence of a leading bitplane A, the phased bitplane B and a following bitplane C (e.g. block 403 of method 400).

Put another way, in these implementations, computing device 111 is further configured to: at least in the time period corresponding to prime display 105 being driven according to the phased bitplane B, drive the adjacent pixel groups of premod display 103 according to a bitplane ABC' comprising an OR-function of premod and/or blurred versions of each of the leading bitplane A, the phased bitplane B and the following bitplane C. Timing of such a driving scheme is described below with respect to timing 1101 of FIG. 11.

Figure 6:
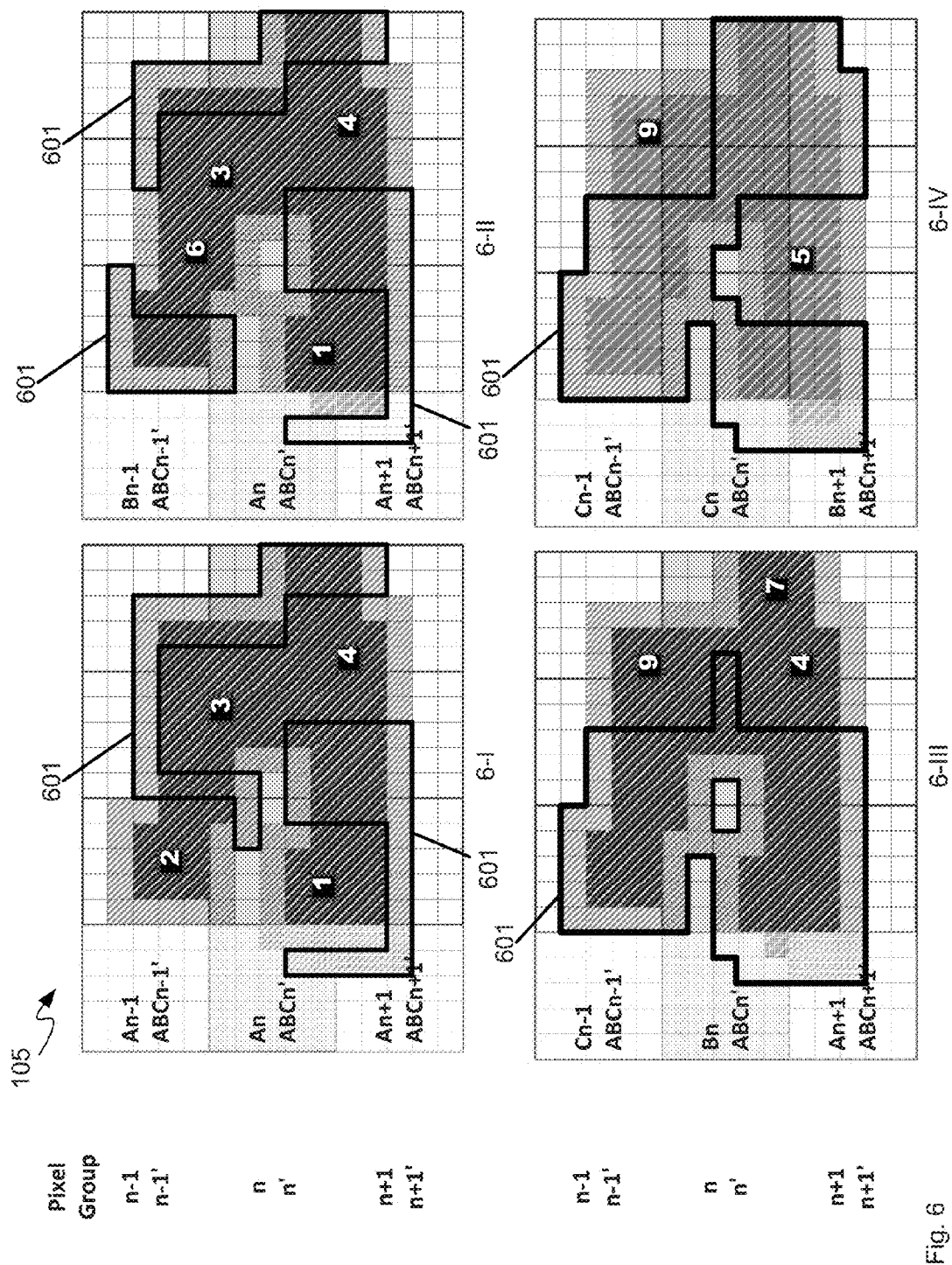
FIG. 6 depicts illumination of the prime display using images formed from an OR-function global bitplane, according to non-limiting implementations.

Put yet another way, computing device is further configured to: drive prime display 105 according to a phased sequence to transition prime display 105 from a leading bitplane to a following bitplane; and, at least in a time period corresponding to prime display 105 being driven according to the phased sequence, drive adjacent pixel groups of premod display 103 according to an OR-function of premod and/or blurred versions of respective portions of each of at least the leading bitplane and the following bitplane. Furthermore, described heretofore, the phased sequence comprises a phased bitplane and the adjacent pixel groups of premod display 103 are driven according to the OR-function of the premod and/or blurred versions of respective portions of the leading bitplane, the phased bitplane and the following bitplane, at least in the time period corresponding to prime display 105 being driven according to the phased bitplane The effect of such a driving scheme is shown in FIG. 6, which is substantially similar to FIG. 3, with like elements having like numbers. Specifically, FIG. 6 depicts images formed by premod display 103 illuminating prime display 105 in a sequence of views 6-I, 6-II, 6-III, 6-IV as the pixel groups of display 105 are phased from bitplane A to bitplane B, and to bitplane C, and as an image formed by global bitplane ABC' from premod display 103 illuminates prime display 105.

The result is that each of pixels 1, 2, 3, 4, 5, 6, 7, 8, 9 are always illuminated by a corresponding 3×3 group of premod pixels (resulting in 5×5 patches of light), regardless of a status of an adjacent pixel group in either of prime display 105 and/or premod display 103.

Furthermore, flicker artifacts at pixel group boundaries are reduced and/or eliminated, as compared to illumination portions 301, 305, 306, 307, 308 of FIG. 3.

Such a driving scheme can, however, lead to a halo effect in area 601 that includes pixels that are "on" in one pixel group time period but "off" in another pixel group time period. In other words, the use of the OR-function causes all prime pixels that are "on" in any of bitplanes A, B, C to be illuminated in all of bitplanes A, B, C regardless of their current state. When the corresponding prime pixel (i.e. of prime display 105) is "on" the pixel appears in the image 113 but is otherwise dimmed by the contrast ratio of prime display 105. The dim patch of illumination in the area where one of the bitplanes has the pixel "on" is a halo artifact. However, as the "on" pixels are always properly illuminated when "on" the artifacts, including, but not limited to flicker artifacts, can be reduced and/or eliminated. Hence, in these implementations, the halo effect can become a tradeoff for reducing other types of artifacts, such as flicker artifacts.

Figure 7:
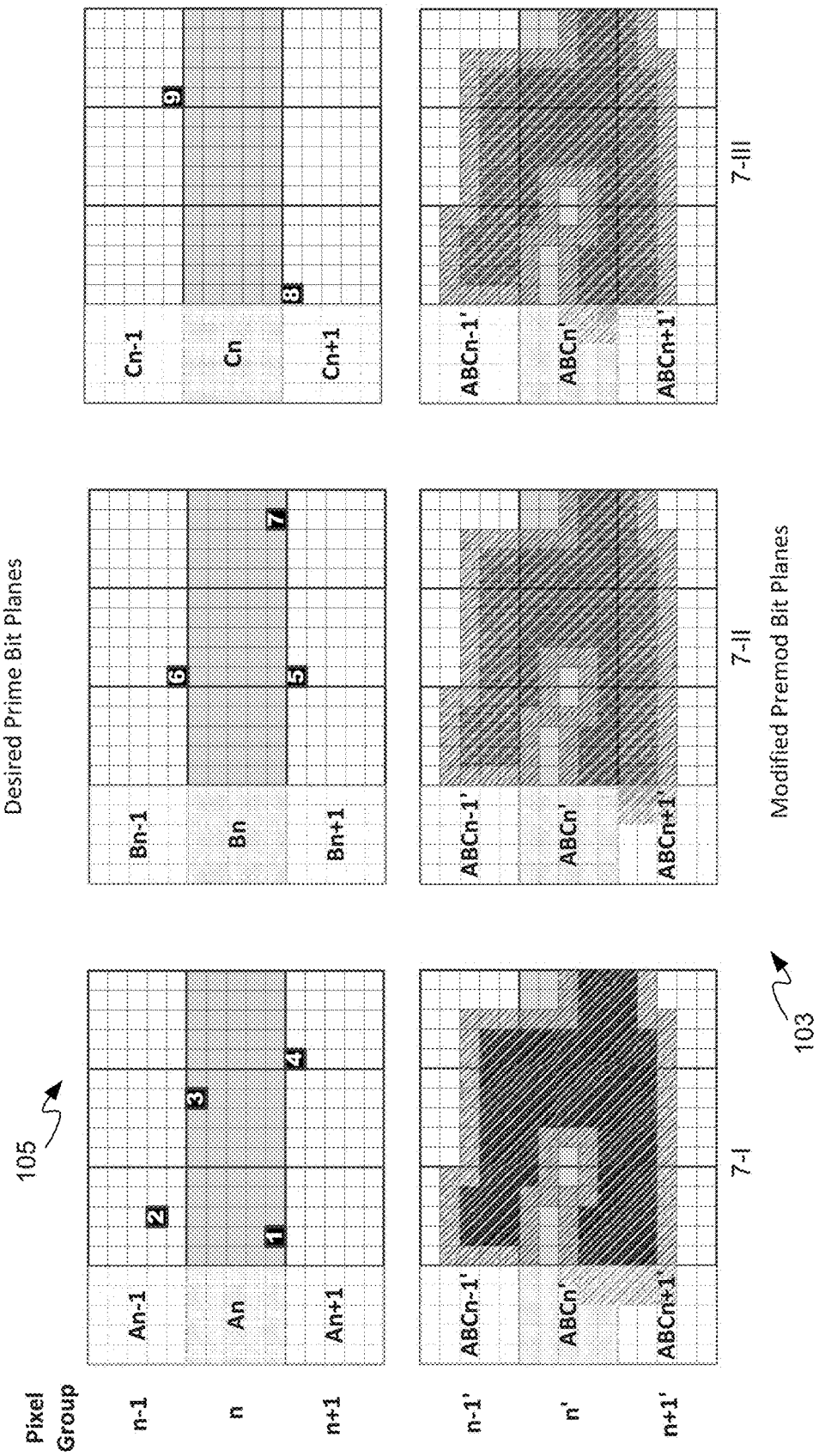
FIG. 7 depicts a portion of each of the prime display and the premod display, of the projector of FIG. 1, being driven in a sequence that includes an OR-function global bitplane at the premod display being used through three load periods, according to non-limiting implementations.

In some implementations, to simplify the driving scheme, each of bitplanes A', C' can also be replaced with bitplane ABC', as depicted in FIG. 7, which is substantially similar to FIG. 5, with like elements having like numbers. Hence, FIG. 7 depicts a sequence of views 7-I, 7-II, 7-III, as prime display 105 is being transitioned from being driven between bitplanes A, B, C, with bitplane B being a phased bitplane, though the entire bitplane B is depicted without phasing as in FIGS. 2 and 5.

In any event, in contrast to FIGS. 5 and 6, in FIG. 7, each of bitplanes A', C' are also replaced with bitplane ABC' which is switched onto premod display 103 globally such that all pixel groups are changed simultaneously. Put another way, in these implementations, computing device 111 is further configured to drive premod display 103 according to the premod bitplane ABC' during respective time periods of prime display 105 being driven according to the leading bitplane A and the following bitplane C.

Timing of such a driving scheme is described below with respect to timing 1002 of FIG. 10. While this can lead to yet further halos when bitplane A and bitplane C are used to drive prime display 105, artifacts, including but not limited to, flicker artifacts can be reduced and/or eliminated in a manner similar to the driving scheme of FIGS. 5 and 6.

In each of the driving schemes of FIGS. 5 and 7, the OR-function bitplane used to drive premod display 103 is switched globally. However, in other implementations, the OR-function bitplane can comprise a phased bitplane timed to drive premod display 103 in a synchronized manner with the phased bitplane used to drive prime display 105. The timing of such driving schemes is described in more detail below with regard to FIG. 12. However, the effect of each of these driving schemes on flicker artifacts is depicted in each of FIGS. 8 and 9.

Figure 8:
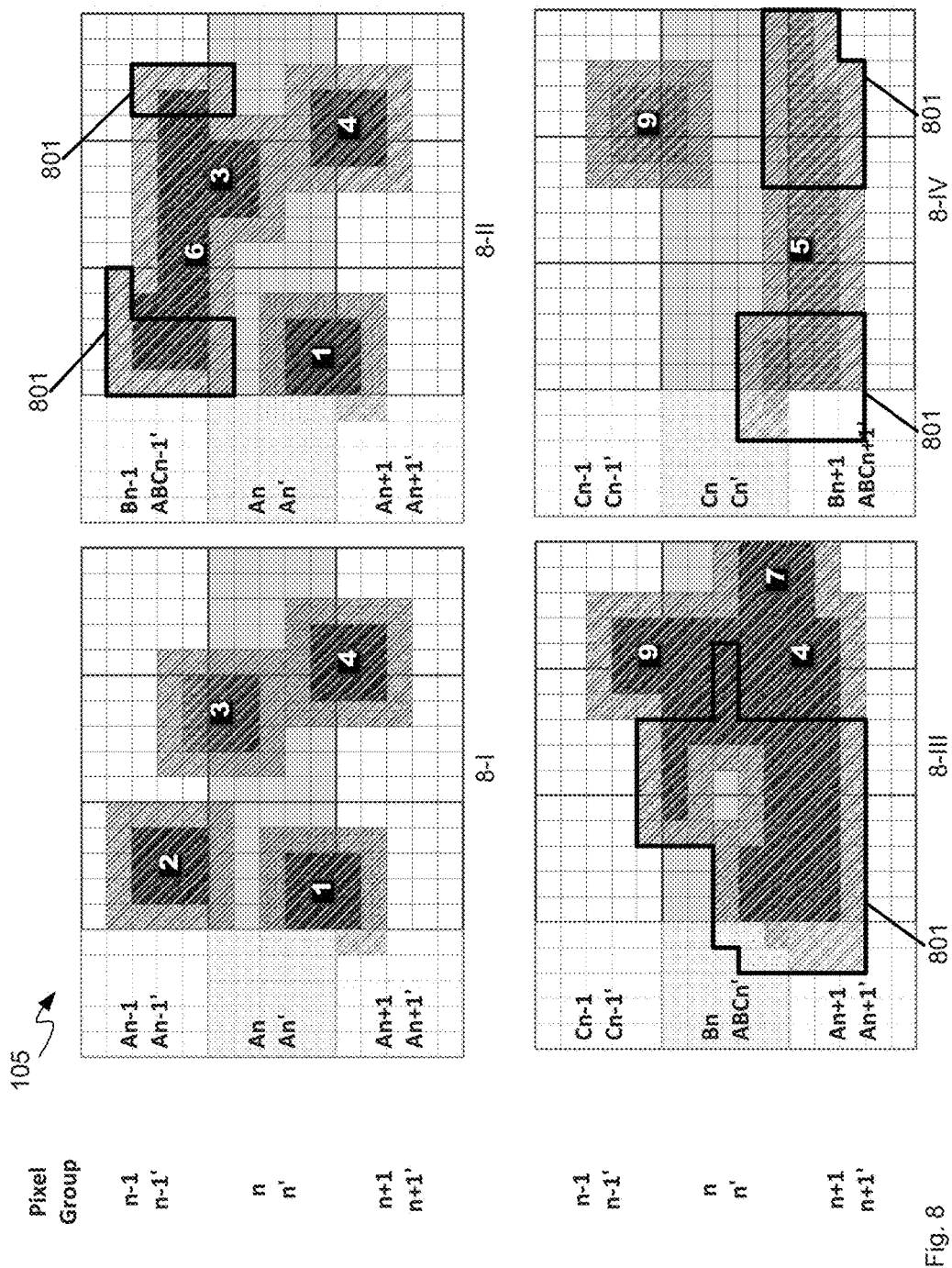
FIG. 8 depicts a portion of each of the prime display and the premod display, of the projector of FIG. 1, being driven in a sequence that includes an OR-function phased bitplane at the premod display, according to non-limiting implementations.

Hence, attention is next directed to FIG. 8, which is substantially similar to FIG. 3, with like elements having like numbers. Specifically, FIG. 8 depicts images formed by premod display 103 illuminating prime display 105 in a sequence 8-I, 8-II, 8-III, 8-IV as the prime pixel groups of display 105 are phased from leading bitplane A to bitplane B, and to following bitplane C. Specifically images formed by premod display 103 are also phased from a leading bitplane A' to phased bitplane ABC', and to following bitplane C' with phasing of pixel groups on premod display 103 (which can also be referred to as premod pixel groups) being similar and/or the same as phasing of corresponding pixel groups of prime display 105.

Put another way, in implementations depicted in FIG. 8, computing device 111 is further configured to: at least in the time period corresponding to prime display 105 being driven according to the phased bitplane, drive the adjacent pixel groups of premod display 103 in a respective sequence across premod display 103 according to a phased premod bitplane, wherein each portion of the phased premod bitplane comprises the OR-function of the premod and/or blurred versions of corresponding portions of each of the leading bitplane, the phased bitplane and the following bitplane used to drive prime display 105. Timing of such a driving scheme is described below with respect to timing 1201 of FIG. 12.

In other words, as compared to FIG. 3, in FIG. 8 bitplane portions Bn−1', Bn', Bn+1' are replaced with bitplane portions ABCn−1', ABCn', ABCn+1', each of which comprise an OR-function of the corresponding bitplane portions of premod and/or blurred versions bitplanes A, B, C.

Hence, view 8-I is similar to view 3-I, but in view 8-II, bitplane portion Bn−1' has been replaced with bitplane portion ABCn−1' which is an OR-function of bitplane portions An−1', Bn−1', Cn−1'. Hence, pixel 3 is fully illuminated, as compared to FIG. 3.

Similarly in view 8-III, bitplane portion Bn' has been replaced with bitplane portion ABCn', which is an OR-function of bitplane portions An', Bn', Cn'. Hence, pixel 4 and 7 are fully illuminated, as compared to FIG. 3.

Furthermore, there are no flicker artifacts at pixel group boundaries, as compared to illumination portions 301, 305, 306, 307, 308 of FIG. 3.

Note that halos 801 are present and again represent a compromise with reducing and/or eliminating flicker artifacts.

However, neither of pixels 5, 6 are fully illuminated.

This can be addressed by lengthening a time period that each of pixel groups of premod display 103 are driven according to bitplane portions ABCn−1', ABCn', ABCn+1'.

Figure 9:
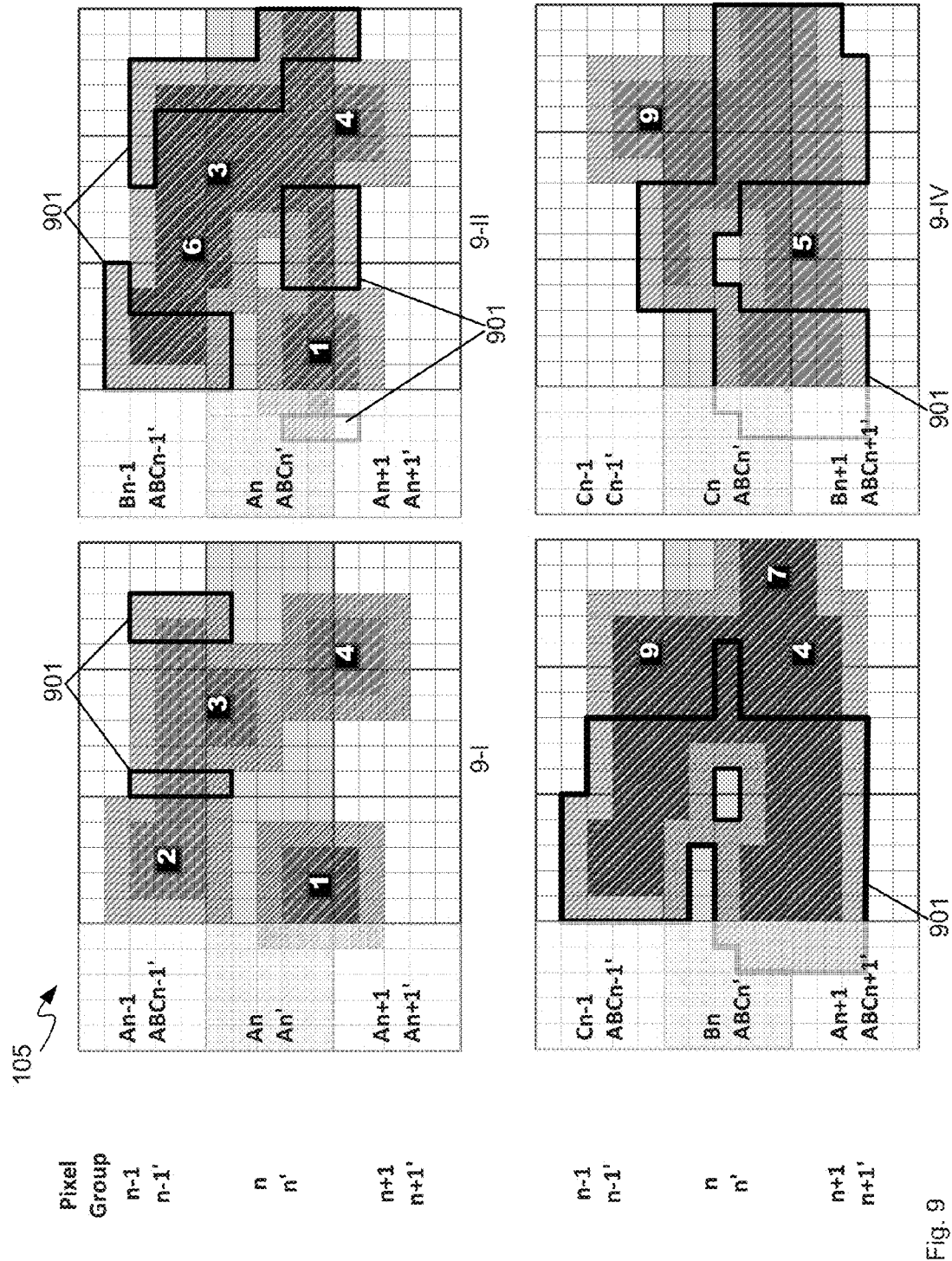
FIG. 9 depicts a portion of each of the prime display and the premod display, of the projector of FIG. 1, being driven in a sequence that includes an OR-function phased bitplane at the premod display with extended time periods, according to non-limiting implementations.

For example, attention is next directed to FIG. 9, which is substantially similar to FIG. 8, with like elements having like numbers. Specifically, FIG. 9 depicts images formed by premod display 103 illuminating prime display 105 in a sequence 9-I, 9-II, 9-III, 9-IV as the pixel groups of display 105 are phased from bitplane A to bitplane B, and to bitplane C. Specifically each of the adjacent pixel groups of premod display 103, driven according to phased premod bitplane ABC', are driven for a longer time period than each of corresponding pixel groups of prime display 105.

Specifically, each of the adjacent pixel groups of premod display 103, other than a first pixel group and a last pixel group, can be driven according to the phased premod bitplane for a time period starting at a beginning of a previous driving period of a corresponding previous pixel group of prime display 105 to an ending of following driving period of a corresponding following prime pixel group of prime display 105. Timing of such a driving scheme is described below with respect to timing 1301 of FIG. 13.

Figure 13:
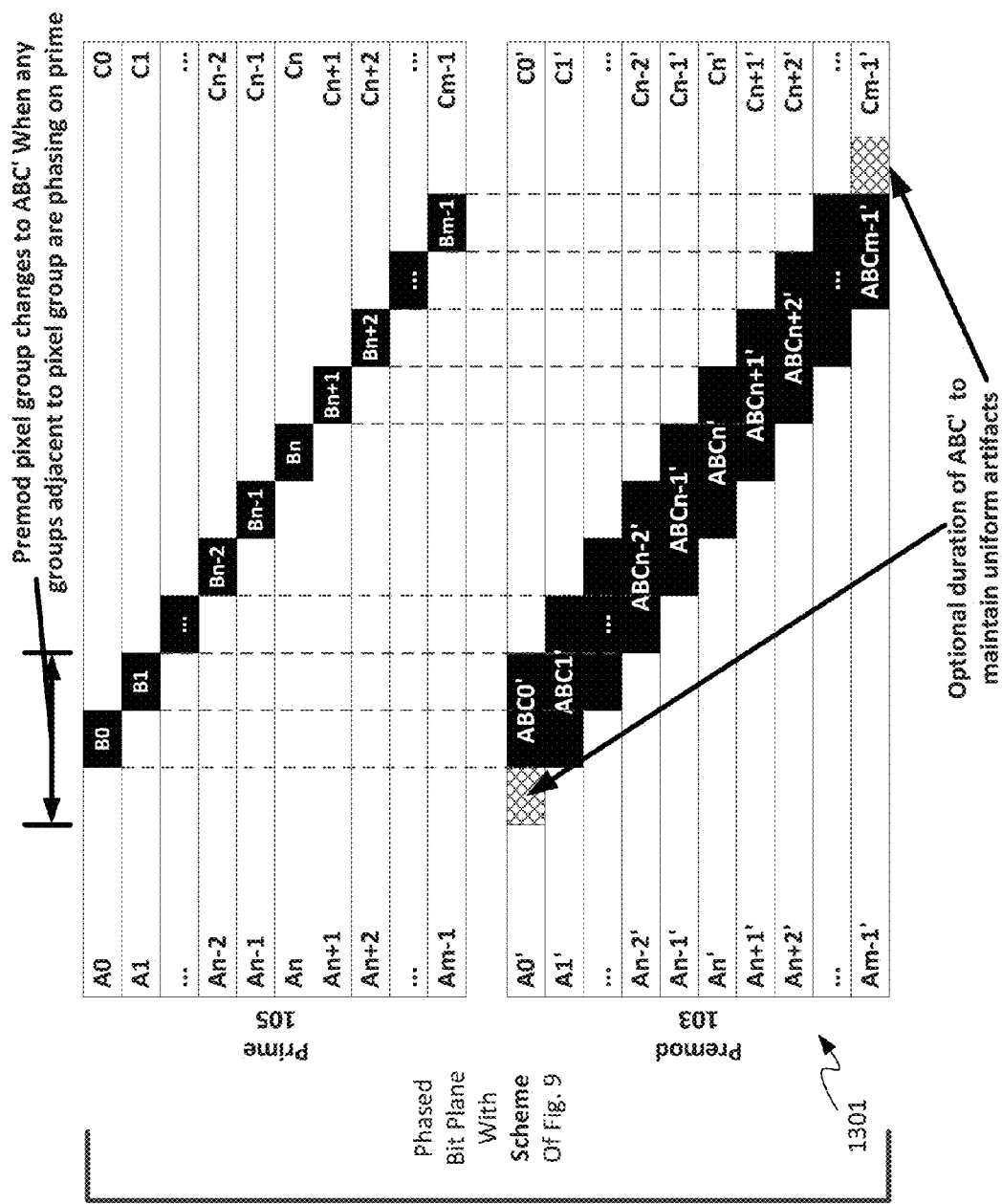
FIG. 13 depicts timing diagrams of the driving schemes of FIG. 9, according to non-limiting implementations.

However, in some implementations, a respective time period of each of the first pixel group and a last pixel group of premod display 103 can also be lengthened, as also depicted in FIG. 13. Indeed, in FIG. 9, it is assumed that bitplane portion ABCn−1' is used to drive pixel group n−1' of premod display 103 prior to bitplane portion Bn−1 being used to drive pixel group n−1 of prime display 105.

Specifically in FIG. 13, first pixel group 0 is driven for a respective time period beginning during prime display 105 being driven according to the first phased bitplane B0 to an ending of a second driving period of a corresponding second prime pixel group 1 of prime display 105, when the second prime pixel group is transitioned to bitplane C1.

Furthermore, while not depicted in FIG. 9, a last pixel group is driven for a respective time period starting at a beginning of a second-last driving period of a corresponding previous pixel group of prime display 105 and ending during prime display 105 being driven according to the following bitplane.

In other words, as compared to FIG. 3, in FIG. 9 bitplane portions An−1', Bn−1' and Cn−1' are replaced with bitplane portion ABCn−1' at specific times (e.g. corresponding to when prime display 105 is being driven according to bitplane portions An−1, Bn−1 and Cn−1); An', Bn' and Cn' are replaced with bitplane portion ABCn' at specific times(e.g. corresponding to when prime display 105 is being driven according to bitplane portions An, Bn and Cn); and bitplane portions An+1' and Bn+1' are replaced with ABCn+1' at specific times(e.g. corresponding to when prime display 105 is being driven according to bitplane portions An+1, Bn+1 and Cn+1). Bitplanes ABCn−1', ABCn' and ABCn+1' each comprise an OR-function of the corresponding bitplane portions of premod and/or blurred versions of bitplanes A, B, C.

Furthermore, as compared to FIG. 8, the time periods that bitplane portions ABCn−1', ABCn', ABCn+1' are used to drive premod display 103 are longer than respective time periods that bitplane portions Bn−1, Bn, Bn+1 are used to drive prime display 105.

For example, in FIG. 9, bitplane portion ABCn−1' is used to drive pixel group n−1' of premod display 103 starting from when a bitplane portion Bn−2 is being used to a drive pixel group n−2 of prime display 105 to an end of when bitplane portion Cn is being used to drive pixel group n of prime display 105 (e.g. in each of views 9-I, 9-II, 9-III; while pixel group n−2 is not depicted, it can nonetheless be present at prime display 105 and be "above" pixel group n−1 in FIG. 9; furthermore, such a pixel group n−2 is assumed to transition from a bitplane portion An−2 in a view preceding view 9-I to a bitplane portion Bn−2 in view 9-I).

Similarly, bitplane portion ABCn' is used to drive pixel group n' of premod display 103 starting from when bitplane portion Bn−1 is being used to drive pixel group n−1 of prime display 105 to an end of when bitplane portion Cn+1 is being used to drive pixel group n+1 of prime display 105 (e.g. in each of views 9-II, 9-III, 9-IV).

Similarly, bitplane portion ABCn+1' is used to drive pixel group n+1' of premod display 103 starting from when bitplane portion Bn is being used to drive pixel group n of prime display 105 to an end of when a bitplane portion Cn+2 is being used to drive a pixel group n+2 of prime display 105 (e.g. in each of views 9-II, 9-III, 9-IV; while pixel group n+2 is not depicted, it can nonetheless be present at prime display 105 and be "below" pixel group n+1 in FIG. 9; it is assumed that a bitplane portion Cn+2 can be used to drive pixel group n+2 of prime display 105 for example in a view following view 9-IV).

Such a driving scheme can cause each pixel of prime display 105 to be fully illuminated and further reduce and/or eliminate flicker artifacts, as well as reduce the halo effect as compared to the driving scheme of FIG. 8.

For example, again, there are no flicker artifacts at pixel group boundaries, as compared to illumination portions 301, 305, 306, 307, 308 of FIG. 3.

Furthermore, each "on" pixel of prime display 105 is fully illuminated. While halos 901 are present they can be reduced in duration and thus intensity compared at least to FIG. 6.

Timing of the previously described driving schemes of method 400 will now be described with reference to FIGS. 10, 11 and 12.

Hence, attention is next directed to FIG. 10, where each row represents a respective pixel group from a top to a bottom of a respective display (e.g. "Prime" display 105 and "Premod" display 103), and a bitplane portion used to drive each pixel group at a given time, is shown in the pixel group. Furthermore, time in FIG. 10 is assumed to flow from left to right; for example, in timing 1001, in the top pixel group, bitplane portion A0 is first used to drive the pixel group, then bitplane portion B0 is used to drive the pixel group, and then bitplane portion C0 is used to drive the pixel group. Hence, relative timing of driving pixel groups is depicted as time flows from left to right.

In particular, FIG. 10 depicts timing 1001 of the driving scheme of FIGS. 2 and 3 where, at prime display 105 ("prime" in FIG. 10), in a first "Load" time, TL, period bitplane A is used to drive all pixel groups (with bitplane portions of bitplane A shown as A0, A1 . . . An−1, An, An+1 . . . Am−1 in respective pixel groups) while bitplane B is loaded. In a last "Load" time period, bitplane C is used to drive all pixel groups (with bitplane portions of bitplane C shown as C0, C1 . . . Cn−1, Cn, Cn+1 . . . Cm−1 in respective pixel groups) while the following bitplane is loaded. In a transition "Load" time period (e.g. a time period corresponding to prime display 105 being driven according to a phased bitplane), switching of prime display 105 is performed in a phased sequence, with a first (e.g. top) pixel group switched from a leading bitplane portion A0 to a phased bitplane portion B0, after which the following bitplane portion C0 is loaded into the pixel group and then the pixel group is switched to following bitplane portion C0; each successive pixel group in the transition "Load" time period, TPL, is switched in a similar phased manner in the phased sequence. And each pixel group in the phased transition time period is switched to a respective portion of a phased bitplane B for a time period TP, which can also be referred to as the phased bitplane duration.

Timing 1001 also shows timing of premod display 103, which is switched in a similar manner with the premod versions of the corresponding bitplane portions used to drive premod display 103 synchronized with prime display 105, as described with reference to FIG. 3.

FIG. 10 further depicts timing 1002 of the driving scheme of FIG. 7 in which each bitplane of premod display 103 in each timing period is replaced with a global "OR-function" bitplane ABC', as represented in FIG. 10 by bitplane portions ABC0', ABC1' . . . ABCn−1', ABCn', ABCn+1' . . . ABCm−1'. Hence, switching of pixel groups of premod display 103 is simplified with respect to timing 1001, and the flicker artifacts at pixel group boundaries can be reduced and/or eliminated.

Figure 11:
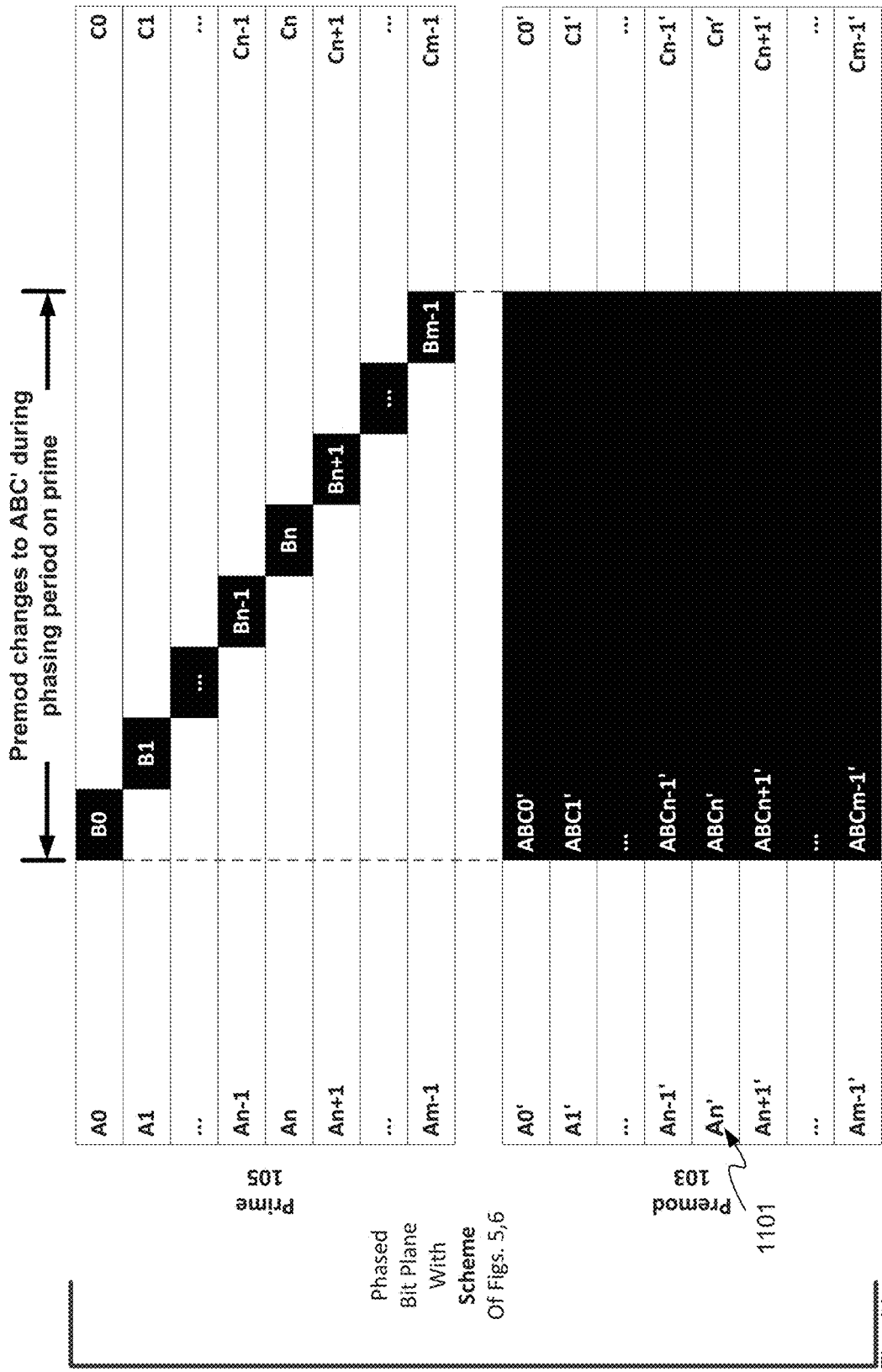
FIG. 11 depicts timing diagrams of the driving scheme of FIGS. 5 and 6, according to non-limiting implementations.

Attention is next directed to FIG. 11, which depicts timing 1101 of the driving scheme of FIGS. 5 and 6, which is similar to timing 1002, however when prime display 105 is being driven according to bitplanes A, C, premod display 103 is also being driven according to premod and/or blurred versions of global bitplanes A, C (i.e. premod display 103 is being driven according to global bitplanes A', C'). Hence, switching of pixel groups of premod display 103 is again simplified with respect to timing 1001, and the flicker artifacts at pixel group boundaries can be reduced and/or eliminated.

Figure 12:
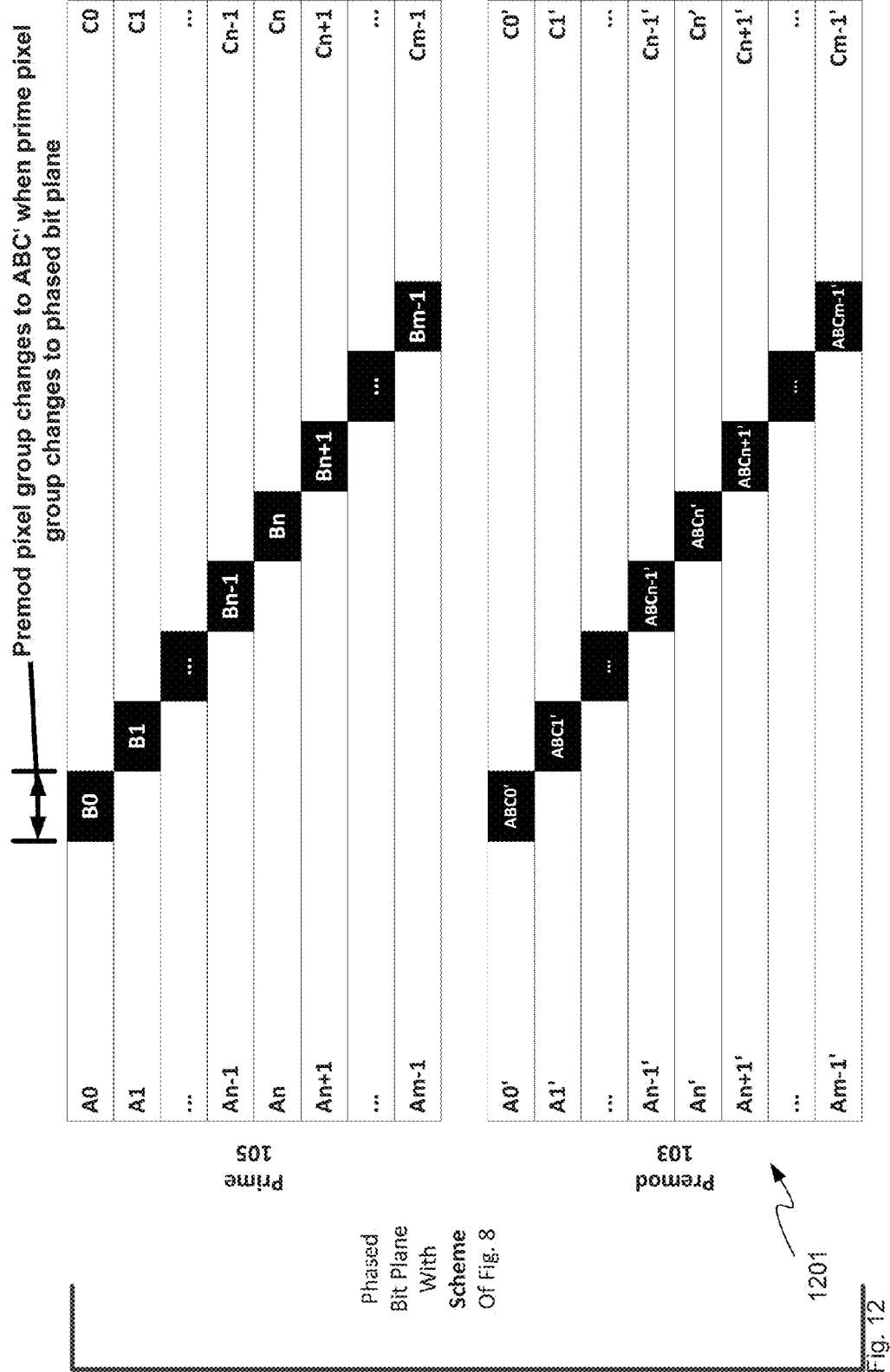
FIG. 12 depicts timing diagrams of the driving schemes of FIG. 8, according to non-limiting implementations.

Attention is next directed to FIG. 12, which depicts timing 1201 of the driving schemes of FIG. 8. Specifically, timing 1201 depicts the driving scheme of FIG. 8 in which adjacent pixel groups of premod display 103 are driven in a respective sequence across premod display 103 according to a phased premod bitplane, wherein each portion of the phased premod bitplane comprises the OR-function of the premod and/or blurred versions of corresponding portions of each of the leading bitplane, the phased bitplane and the following bitplane. In other words, while each pixel group of prime display 105 is being driven according to each respective portion of phased bitplane B, a respective bitplane of premod display 103 is driven according to a respective portion of bitplane ABC', which is processed by processor 120 as a phased bitplane. Hence, for example, while the first pixel group of prime display 105 is driven according to phased bitplane portion B0, the corresponding first pixel group of premod display 103 is driven according to phased bitplane portion ABC0'; when the first pixel group of prime display 105 changed to being driven according to leading bitplane portion C0, the corresponding first pixel group of premod display 103 changed to being driven according to following bitplane portion C0', and simultaneously: the second pixel group of prime display 105 changes from being driven according to leading bitplane portion A1 to phased bitplane portion B1, and the corresponding second pixel group of premod display changes from being driven according to leading bitplane portion A1' to phased bitplane portion ABC1'. Such phased driving of each of displays 103, 105 continues until the last pixel group of each display 103, 105 is being driven according to a last portion Cm−1, Cm−1' of each respective following bitplane C, C'.

Hence, in timing 1201, each pixel group of premod display 103 is driven synchronously with a corresponding pixel group of prime display 105 such that a start time and an end time of driving of each pixel group during driving according to phased bitplane ABC' are the same as a corresponding start time and a corresponding end time of driving of each corresponding pixel group according to phased bitplane B at prime display 105.

Put another way, computing device 111 can be further configured to: at least in the time period corresponding to prime display 105 being driven according to the phased bitplane, drive the adjacent pixel groups of premod display 103 in a respective sequence across premod display 103 according to a phased premod bitplane (e.g. phased bitplane ABC'), wherein each portion of the phased premod bitplane comprises the OR-function of the premod and/or blurred versions of corresponding portions of each of the leading bitplane, the phased bitplane and the following bitplane used to drive respective portions of prime display 105.

Attention is next directed to FIG. 13, which depicts timing 1301 of the driving schemes of FIG. 9. While timing 1301 is generally similar to timing 1201, in timing 1301 each of the adjacent pixel groups of premod display 103, driven according to the phased premod bitplane ABC', are driven for a longer time period than each of corresponding pixel groups of prime display 105.

Specifically, in timing 1301, each of the adjacent pixel groups of premod display 103 are driven according to the phased premod bitplane ABC', are driven for a time period starting at a beginning of the earliest driving period of either the corresponding prime pixel group or an adjacent corresponding pixel group of prime display 105 to the end of latest driving period of either the corresponding prime pixel group or an adjacent corresponding prime pixel group of prime display 105.

For example, the $n^{th}$ pixel group of premod display 103 is driven according to a $n^{th}$ bitplane portion ABCn' from a time period starting when the corresponding $n-1^{th}$ pixel group of prime display 105 is driven according to a $n-1^{th}$ bitplane portion Bn−1, and ending to when the corresponding $n+1^{th}$ pixel group of prime display 105 is completed being driven according to a $n+1^{th}$ bitplane portion Bn+1. Indeed, alignment of starting and end times of pixel groups on each of displays 103, 105 is indicated via stippled lines in FIG. 12.

Where premod pixel groups have differing numbers of adjacent corresponding prime pixel groups, for example at the edge of the display if the pixel groups are horizontal stripes as shown in FIG. 13, then the edge pixel groups may be driven with the ABC' bitplane for a different length of time than the other pixel groups.

For example, as depicted in FIG. 13, the first pixel group of premod display 103 is driven according to the first bitplane portion ABC0' from a time period starting when the corresponding first pixel group of prime display 105 is driven according to the first bitplane portion B0 (as there is no adjacent prime pixel group driven earlier), and ending when the second pixel group of prime display 105 is completed being driven according to the second bitplane portion B1.

Similarly the last premod pixel group is driven according to the last bitplane portion ABCm−1' from a time period starting when the corresponding second last pixel group of prime display 105 is driven according to the second last bitplane portion (e.g. the pixel group labelled " . . . " in FIG. 13) and ending when the last pixel group of prime display 105 is completed being driven according to the last bitplane portion Bm−1 (as there is no adjacent prime pixel group driven later).

In some of these implementations, all premod pixel groups will be driven for the same duration with the OR-function of the premod and/or blurred versions of corresponding portions of each of the leading bitplane, the phased bitplane and the following bitplane used to drive respective portions of prime display 105.

For example, as depicted in the optional shaded region of the first and last pixel groups of premod display 103 in timing 1301, the driving period for the first bitplane ABC0' and last bitplane ABCm−1' can be extended to match the driving period of the other premod pixel groups labelled "ABC1'", "ABCn'", etc. In other words, each premod display 103 shaded area/time period of timing 1301 is of a similar length of time of each of the regions labelled "ABC0'", "ABC1'", etc.

Heretofore, driving schemes that use phased bitplanes to drive prime display 105 have been described, and specifically a phased bitplane between a leading bitplane and a following bitplane. However, in other implementations, prime display 105 can transition between a leading bitplane and following bitplane using a phased sequence. In other words, prime display 105 can be globally switched to a leading bitplane and then phased switched to a following bitplane without the use of an intervening phased bitplane. When premod display 103 is driven in a similar manner, such a driving scheme can also suffer from artifacts similar to those described above with respect to FIGS. 2 and 3.

Figure 14:
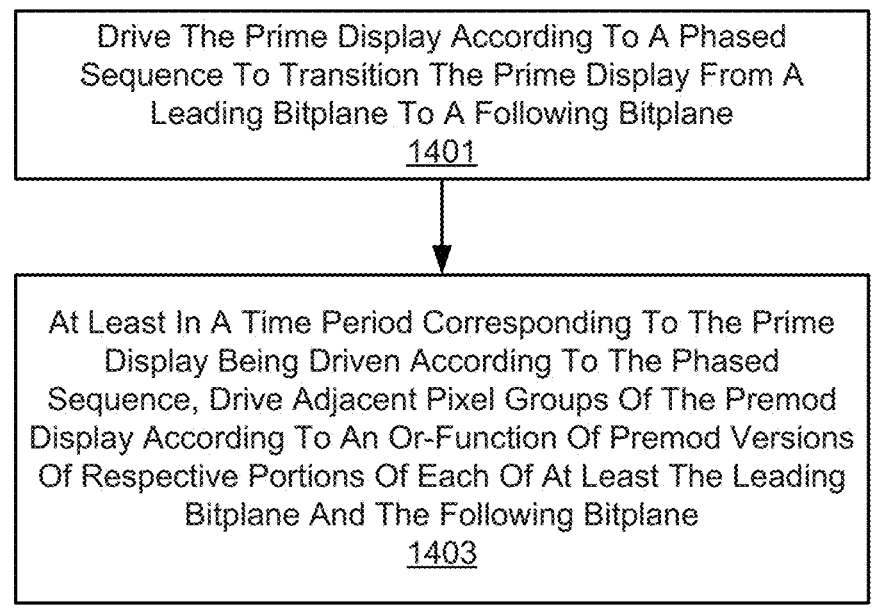
FIG. 14 depicts a schematic block diagram of a flowchart of a method operating the projector of FIG. 1 to when the prime display is driven according to a phased sequence to transition from a leading bitplane to a following bitplane, according to non-limiting implementations.

Hence, attention is next directed to FIG. 14 which depicts a block diagram of a flowchart of a method 1400 of operating projector 100 when transitioning a prime display from a leading bitplane to a following bitplane, according to non-limiting implementations. In order to assist in the explanation of method 1400, it will be assumed that method 1400 is performed using projector 100, and specifically by computing device 111, for example when processor 120 processes instructions stored at memory 122. Indeed, method 1400 is one way in which projector 100 can be configured. Furthermore, the following discussion of method 1400 will lead to a further understanding of projector 100, and its various components. However, it is to be understood that projector 100 and/or method 1400 can be varied, and need not work exactly as discussed herein in conjunction with each other, and that such variations are within the scope of present implementations.

Regardless, it is to be emphasized, that method 1400 need not be performed in the exact sequence as shown, unless otherwise indicated; and likewise various blocks may be performed in parallel rather than in sequence; hence the elements of method 1400 are referred to herein as "blocks" rather than "steps". It is also to be understood, however, that method 1400 can be implemented on variations of projector 100 as well.

At block 1401, computing device 111 drives prime display 105 according to a phased sequence to transition prime display 105 from a leading bitplane to a following bitplane.

At block 1403, computing device 111, at least in a time period corresponding to prime display 105 being driven according to the phased sequence, drives adjacent pixel groups of premod display 103 according to an OR-function of premod versions of respective portions of each of at least the leading bitplane and the following bitplane.

As described above, the premod versions of respective portions of each of at least the leading bitplane and the following bitplane can comprise blurred versions of respective portions of each of at least the leading bitplane and the following bitplane.

Method 1400 is next described with reference to FIG. 15, which depicts timing 1501 of: prime display 105 being driven according to a phased sequence to transition prime display 105 from a leading bitplane E to a following bitplane F (e.g. a phased switch between two bitplanes instead of three as described heretofore); and switching of pixel groups of premod display 103 being driven in a respective sequence across premod display 103 according to a phased premod bitplane EF', wherein each portion of the phased premod bitplane EF' comprises the OR-function of the premod and/or blurred versions of the corresponding portions of each of the leading bitplane E and the following bit plane F. Furthermore, switching of each successive pixel group of prime display 105 in the phased sequence occurs separated by a time period TP, analogous to the time period TP described with reference to FIG. 10; hence time period TP as used in reference to FIG. 15 can also be referred to as a "phased bitplane duration" even though no phased bitplane intervenes between the leading and following bitplanes at prime display 105.

In other words, while each pixel group of prime display 105 is being switched using a phased sequence from the leading bit plane E to the following bit plane F, a respective bitplane of premod display 103 is driven according to a respective portion of bitplane EF'. Hence, for example, while the first pixel group of prime display 105 is switched from leading bitplane portion E0 to following bitplane portion F0, the corresponding first pixel group of premod display 103 is switched from leading premod bitplane E0' to the phased bitplane portion EF0'. The first pixel group of premod display 103 is switched to the following premod bitplane F0' only when all adjacent corresponding pixel groups of the prime display 105 have switched to following bitplane F, for example, when the second pixel group of prime display 105 switches to bitplane F. Such phased switching of each of displays 103, 105 continues until the last pixel group of each display is being driven according to a last portion Fm−1, Fm−1' of each respective following bitplane F, F'.

Hence, in timing 1501, each pixel group of premod display 103 is driven with phased premod bitplane EF' for a time period starting at the earliest switch time to following bitplane F of the corresponding prime pixel group or adjacent corresponding pixel group of prime display 105 to the latest switching time to following bitplane F of the corresponding prime pixel group or an adjacent prime pixel group of prime display 105.

Put another way, computing device 111 can be configured to: at least in the time period corresponding to prime display 105 being switched in phased manner between the leading and following bitplane (and/or driven in a phased sequence to transition the prime display from a leading bitplane to a following bitplane), drive the adjacent pixel groups of premod display 103 in a respective sequence across premod display 103 according to phased premod bitplane (e.g. phased bitplane EF'), wherein each portion of the phased premod bitplane comprises the OR-function of the premod and/or blurred versions of each of the leading bitplane and the following bitplane used to drive respective portions of prime display 105.

Thus, phased switching between two bitplanes on prime display 105 is similar to phased switching between three bitplanes on prime display 105 as described above and depicted in FIGS. 2, 3, 5, 6, 7, 8, 9, 10, 11, 12 and 13.

In particular, whether the two bitplanes or three bitplanes are used to drive prime display 105 in a phased sequence, adjacent pixel groups of premod display 103 can be driven according to the OR-function of premod versions of the respective portions of each of at least the leading bitplane, and the following bitplane. In particular, the OR-function can comprise the OR-function of premod versions of each of corresponding bitplanes used to drive prime display 105. Furthermore, the premod versions of each of corresponding bitplanes used to drive prime display 105 can comprise blurred versions of each of corresponding bitplanes used to drive prime display 105; in other words, the OR-function used to drive premod display 103 can be formed from blurred versions of each of corresponding bitplanes used to drive prime display 105.

Furthermore, whether the two bitplanes or three bitplanes are used to drive prime display 105 in a phased sequence, computing device 111 can be further configured to drive premod display 103 according to a global premod bitplane during respective time periods of prime display 105 being driven according to the leading bitplane and the following bitplane; this can be seen in each of FIGS. 10 and 11.

Figure 15:
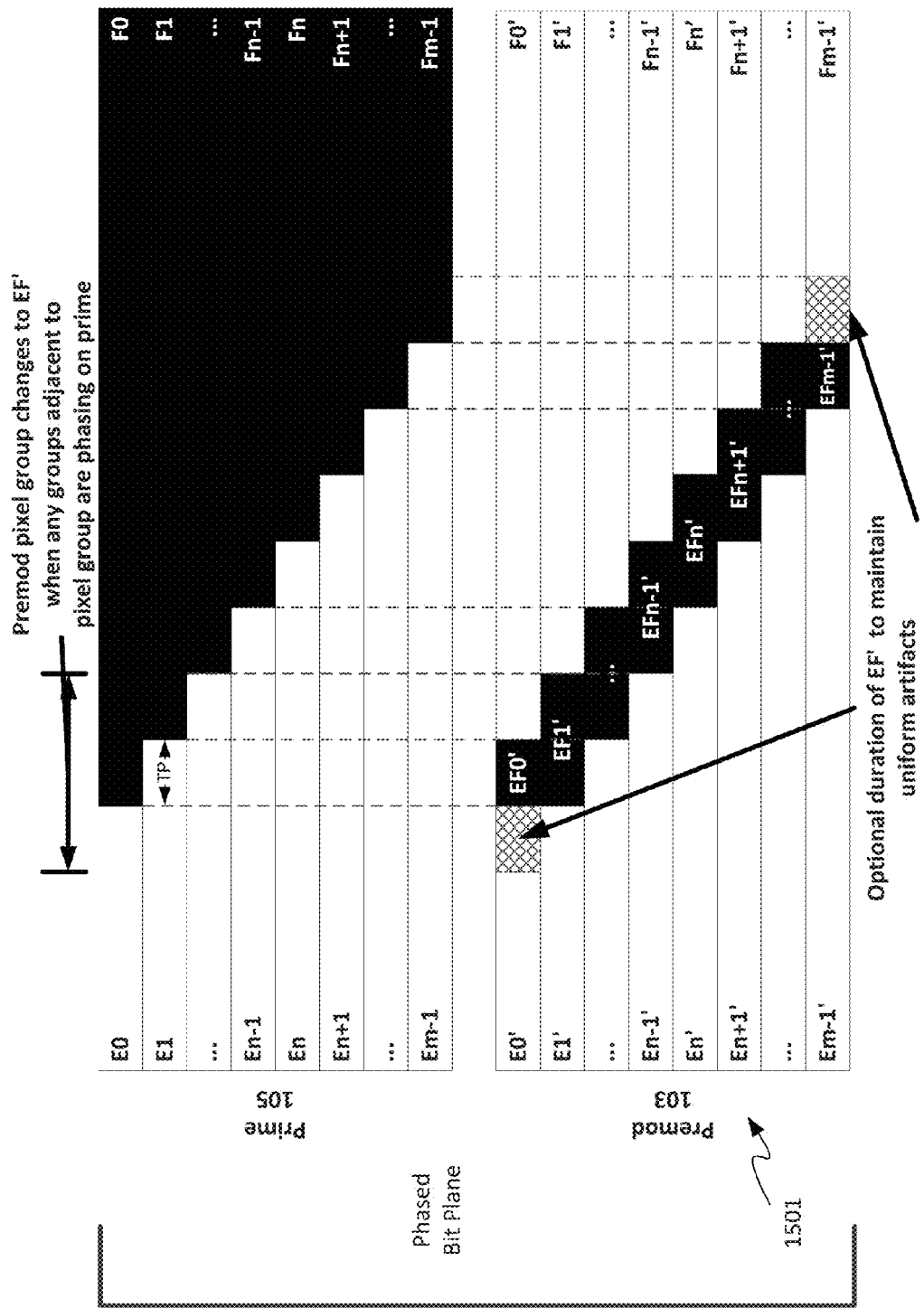
FIG. 15 depicts timing diagrams of the driving schemes of the method of FIG. 14, according to non-limiting implementations.

Furthermore, whether the two bitplanes or three bitplanes are used to drive prime display 105 in a phased sequence, the adjacent pixel groups of the premod display can be driven according to a phased premod bitplane and for a longer time period than each of corresponding pixel groups of prime display 105, as depicted in each of FIGS. 13 and 15. In particular, each of the adjacent pixel groups of premod display 103 can be driven according to a phased premod bitplane and for a time period which: starts at a beginning of an earliest driving period of a corresponding adjacent pixel group of prime display 105; and ends at respective ending of a latest following driving period of a corresponding adjacent following prime pixel group of prime display 105, as depicted in FIGS. 13 and 15. As also depicted in FIGS. 13 and 15, in some of these implementations: wherein a first pixel group of premod display 103 can be driven for a respective time period which: begins during prime display 105 being driven according to the leading bitplane; and ends at a respective ending of a second driving period of a corresponding second prime pixel group of prime display 105; and/or a last pixel group of premod display 103 can be driven for a respective time period which: starts at a respective beginning of a second-last driving period of a corresponding previous pixel group of prime display 105; and ends during prime display 105 being driven according to the following bitplane.

Furthermore, it is appreciated that method 400 can comprise a modified version of method 1400 in which the phased sequence used to transition prime display 105 from a leading bitplane to a following bitplane comprises a phased bitplane, and the adjacent pixel groups of premod display 103 are driven according to the OR-function of the premod versions of respective portions of the leading bitplane, the phased bitplane and the following bitplane, at least in the time period corresponding to prime display 105 being driven according to the phased bitplane, for example as depicted in FIGS. 11, 12 and 13. In particular, as depicted in FIGS. 12 and 13, computing device 111 can be further configured to: at least in the time period corresponding to prime display 105 being driven according to the phased bitplane, drive the adjacent pixel groups of premod display 103 in a respective sequence across premod display 103 according to a phased premod bitplane, wherein each portion of the phased premod bitplane comprises the OR-function of premod versions of corresponding portions of each of the leading bitplane, the phased bitplane and the following bitplane (e.g. used to drive prime display 105).

Attention is next directed to FIG. 16 which summarizes the various driving schemes as described herein in Table 1. For example in timing 1001, where premod display 103 is driven without the OR-function bitplanes described herein, various pixels change in intensity during the time period of the phased bitplane (e.g. corresponding to a "Yes" under the heading "Pixels change intensity"), for example as described above with respect to FIG. 3. Furthermore, a period where halos precede or remain after pixels in the phased bitplane for a period of two times the phased bitplane duration (e.g. corresponding to a "2*TP" under the heading "Halos precede or remain after pixels").

In contrast, in timing 1002, 1101, 1301 and 1501 all pixels of prime display 105 are properly illuminated (i.e. pixels do not change in intensity, "No" under the heading "Pixels change intensity") by the appropriate premod pixels (in the examples, at least a 3×3 groups of pixels) in an image from premod display 103. Thus each of the driving schemes of timing 1002, 1101, 1301 and 1501 can provide reduction and/or elimination of artifacts, including, but not limited to, flicker artifacts. In addition, halos, as described above with respect to FIG. 3, can be observed before pixels appear, after pixels appear, or between pixels for various durations depending on the timing. For timing 1001 halos only appear before and after the pixels, with a period equal to twice the phased bitplane duration ("2*TP" under the heading "Duration halos precede or remain after pixels"). For timings 1002, 1101, 1201, 1301 and 1501 halos can also appear between pixels. For timing 1002 the halo period is equal to the prime display load time (TL) plus the duration of the phased switching (TPL) minus the phased bitplane duration (TP), or "TL+TPL−TP". For timing 1101 the halo period is equal to the number of pixel groups times the phased bitplane duration ("m*TP"). For timing 1201 the halo period is three times the phased bitplane duration ("3*TP"). For timing 1301 the halo period is five times the phased bitplane duration ("5*TP"). For timing 1501 the halo period is twice the phased bitplane duration ("2*TP").

Hence, best performance can occur for timing 1301 (for two phased switches close together) and timing 1501 (for a single phased switch), with regard to a tradeoff between halos, flicker artifacts and constant pixel intensity.

In any event, provided herein is a cascade high dynamic range projector where, when a prime display is transitioned in a phased sequence from a leading bitplane to a following bitplane, at least in a time period corresponding to the prime display being driven according to the phased sequence, adjacent pixel groups of the premod display are driven according to an OR-function of premod versions of respective portions of each of at least the leading bitplane and the following bitplane. The resulting OR-function premod bitplane can be used to drive the premod display globally or as a phased premod bitplane. When the resulting OR-function premod bitplane is used to drive the premod display as a phased premod bitplane, a time period that each pixel group is driven can be the same or longer than a driving time period of corresponding pixel groups of the prime display. Either way, such driving schemes can reduce and/or eliminate artifacts at pixel group boundaries.

Those skilled in the art will appreciate that in some implementations, the functionality of projector 100 and/or computing device 111 can be implemented using pre-programmed hardware or firmware elements (e.g., application specific integrated circuits (ASICs), electrically erasable programmable read-only memories (EEPROMs), etc.), or other related components. In other implementations, the functionality of projector 100 and/or computing device 111 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A projector comprising:
   a light source; a premod display; a prime display, the premod display configured to modulate light from the light source to illuminate the prime display; and, a computing device configured to:
   drive the prime display according to a phased sequence to transition the prime display from a leading bitplane to a following bitplane; and,
   at least in a time period corresponding to the prime display being driven according to the phased sequence, drive adjacent pixel groups of the premod display according to an OR-function of premod versions of respective portions of each of at least the leading bitplane and the following bitplane.

2. The projector of claim 1, wherein the OR-function of the premod versions of the respective portions of each of at least the leading bitplane, and the following bitplane comprises the OR-function of premod versions of each of corresponding bitplanes used to drive the prime display.

3. The projector of claim 1, wherein the premod versions of each of corresponding bitplanes used to drive the prime display comprise blurred versions of each of corresponding bitplanes used to drive the prime display.

4. The projector of claim 1, further comprising optics configured to one or more of convey images in the light conveyed from the premod display to the prime display and blur images in the light conveyed from the premod display to the prime display.

5. The projector of claim 1, wherein the computing device is further configured to drive the premod display according to a global premod bitplane during respective time periods of the prime display being driven according to the leading bitplane and the following bitplane.

6. The projector of claim 1, wherein each of the adjacent pixel groups of the premod display are driven according to a phased premod bitplane and are driven for a longer time period than each of corresponding pixel groups of the prime display.

7. The projector of claim 6, wherein each of the adjacent pixel groups of the premod display, are driven according to a phased premod bitplane and for a time period which: starts at a beginning of an earliest driving period of a corresponding adjacent pixel group of the prime display; and ends at a respective ending of a latest following driving period of a corresponding adjacent following prime pixel group of the prime display.

8. The projector of claim 6, wherein a first pixel group of the adjacent pixel groups of the premod display is driven for a respective time period which: begins during the prime display being driven according to the leading bitplane; and ends at a respective ending of a second driving period of a corresponding second prime pixel group of the prime display.

9. The projector of claim 6, wherein a last pixel group of the adjacent pixel groups of the premod display is driven for a respective time period which: starts at a respective beginning of a second-last driving period of a corresponding previous pixel group of the prime display; and ends during the prime display being driven according to the following bitplane.

10. The projector of claim 1, wherein the phased sequence comprises a phased bitplane and the adjacent pixel groups of the premod display are driven according to the OR-function of the premod versions of respective portions of the leading bitplane, the phased bitplane and the following bitplane, at least in the time period corresponding to the prime display being driven according to the phased bitplane.

11. The projector of claim 10, wherein the computing device is further configured to: at least in the time period corresponding to the prime display being driven according to the phased bitplane, drive the adjacent pixel groups of the premod display in a respective sequence across the premod display according to a phased premod bitplane, wherein each portion of the phased premod bitplane comprises the OR-function of premod versions of corresponding portions of each of the leading bitplane, the phased bitplane and the following bitplane.

12. The projector of claim 1, wherein the OR-function of the premod versions used to drive the premod display includes dither patterns.

13. The projector of claim 1, wherein the adjacent pixel groups comprise adjacent reset groups.

14. The projector of claim 1, wherein each of the premod display and the prime display comprises one or more of a DMD (digital micromirror device) and an LCOS (liquid crystal on silicon) display.

15. The projector of claim 1, further comprising cascade optics configured to convey modulated light rom the premod display to the prime display.

16. A method comprising:
at a projector comprising: a light source; a premod display; a prime display, the premod display configured to modulate light from the light source to illuminate the prime display, and a computing device, driving, using the computing device, the prime display according to a phased sequence to transition the prime display from a leading bitplane to a following bitplane; and,
at least in a time period corresponding to the prime display being driven according to the phased sequence, driving, using computing device, adjacent pixel groups of the premod display according to an OR-function of premod versions of respective portions of each of at least the leading bitplane and the following bitplane.

17. The method of claim 16, wherein the OR-function of the premod versions of the respective portions of each of at least the leading bitplane, and the following bitplane comprises the OR-function of premod versions of each of corresponding bitplanes used to drive the prime display.

18. The method of claim 16, wherein each of the adjacent pixel groups of the premod display are driven according to a phased premod bitplane and are driven for a longer time period than each of corresponding pixel groups of the prime display.

19. The method of claim 16, wherein the phased sequence comprises a phased bitplane and the adjacent pixel groups of the premod display are driven according to the OR-function of the premod versions of respective portions of the leading bitplane, the phased bitplane and the following bitplane, at least in the time period corresponding to the prime display being driven according to the phased bitplane.

20. A non-transitory computer-readable medium storing a computer program, wherein execution of the computer program is for:
at a projector comprising: a light source; a premod display; a prime display, the premod display configured to modulate light from the light source to illuminate the prime display, and a computing device, driving, using the computing device, the prime display according to a phased sequence to transition the prime display from a leading bitplane to a following bitplane; and,
at least in a time period corresponding to the prime display being driven according to the phased sequence, driving, using computing device, adjacent pixel groups of the premod display according to an OR-function of premod versions of respective portions of each of at least the leading bitplane and the following bitplane.

* * * * *